(12) United States Patent
Kitain et al.

(10) Patent No.: US 10,748,440 B1
(45) Date of Patent: Aug. 18, 2020

(54) PROJECTORLESS SIMULATOR WITH ADJUSTABLE SIZE CANOPY

(71) Applicant: Lockheed Martin Corporation, Bethesda, MD (US)

(72) Inventors: Joshua D. Kitain, Orlando, FL (US); O'Shae M. Bridges, Orlando, FL (US); Nolan Lucht, Orlando, FL (US); David J. Macannuco, Winchester, MA (US); Adam R. Breed, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/150,765

(22) Filed: Oct. 3, 2018

(51) Int. Cl.
*G09B 9/30* (2006.01)
*G02B 27/01* (2006.01)
*G06T 7/593* (2017.01)

(52) U.S. Cl.
CPC ......... *G09B 9/307* (2013.01); *G02B 27/0172* (2013.01); *G06T 7/593* (2017.01); *G09B 9/302* (2013.01); *G02B 2027/014* (2013.01); *G02B 2027/0123* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| 5,388,990 A | 2/1995 | Beckman |
| 5,803,738 A | 9/1998 | Latham |
| 6,611,253 B1 | 8/2003 | Cohen |
| 8,781,794 B2 | 7/2014 | Harrison et al. |
| 9,710,972 B2 | 7/2017 | Sanders et al. |
| 9,995,936 B1 * | 6/2018 | Macannuco ....... G02B 27/0172 |
| 2007/0020587 A1 | 1/2007 | Seymore et al. |
| 2008/0166111 A1 * | 7/2008 | Didow ................... G03B 15/07 396/3 |
| 2010/0279255 A1 | 11/2010 | Williams, II |
| 2012/0120498 A1 | 5/2012 | Harrison et al. |

(Continued)

FOREIGN PATENT DOCUMENTS

| EP | 2624238 A1 | 8/2013 |
| WO | 2012052981 A2 | 4/2012 |
| WO | 2017204581 A1 | 11/2017 |

OTHER PUBLICATIONS

Author Unknown, "Coalescence™ mixed reality system introduction," Rockwell Collins, Feb. 6, 2017, YouTube, Retrieved Feb. 20, 2019 from https://www.bing.com/videos/search?q=rockwell+collins+mixed+reality&view=detail&mid=73CDFC2B95270B8B5B5073CDFC2B95270B8B5B50&FORM=VIRE, 1 page.

(Continued)

*Primary Examiner* — Ifedayo B Iluyomade
(74) *Attorney, Agent, or Firm* — Withrow & Terranova, PLLC

(57) ABSTRACT

A projectorless simulator that includes an adjustable frame is disclosed. The adjustable frame defines an interior volume, and is adjustable in width and height to allow a shape of the interior volume to be varied. A chromakey screen is coupled to the adjustable frame to at least partially enclose the interior volume. A plurality of lights is mounted with respect to the adjustable frame. The plurality of lights is configured to emit light in a direction toward the chromakey screen.

22 Claims, 21 Drawing Sheets

(56) References Cited

U.S. PATENT DOCUMENTS

2014/0104274 A1 4/2014 Hilliges et al.
2015/0348326 A1* 12/2015 Sanders ............... G06T 19/006
 345/633
2016/0093230 A1 3/2016 Boggs et al.

OTHER PUBLICATIONS

Author Unknown, "Coalescence™ Mixed Reality System: Merging Real-World and Synthetic Environments," Collins Aerospace, Retrieved Feb. 20, 2019 from https://www.rockwellcollins.com/-/media/files/rc2016/marketing/c/coalescence/coalescence-ds.pdf?lastupdate=20190111193201, 2 pages.
Author Unknown, "FlightSafety Mixed Reality Flight—Specifications," Aug. 2018, FlightSafety International, Retrieved Feb. 20, 2019 from https://resources.flightsafety.com/wp-content/uploads/sites/2/2018/10/Mixed_Reality_Flight_Spec_Sheet_approved.pdf, 1 page.
Author Unknown, "LED Chromakey Systems," 2011-2018, LEDchromaKEY.com, Retrieved Feb. 20, 2019 from https://ledchromakey.com/, 4 pages.
Author Unknown, "VST-2200FL Flight Simulator," Virtual SimTech, 2013, http://www.virtualsimtech.com/flightsimulators.htm, 2 pages.
McClernon, Chris et al., "PC-Based Desktop Display versus Immersive Head-Mounted Display Flight Simulator Performance," Interservice/Industry Training, Simulation, and Education Conference (I/ITSEC), Dec. 2006, http://www.iitsecdocs.com, 7 pages.
Santana, M., "Bohemia Interactive to unveil new simulation tech at I/ITSEC," Nov. 7, 2017, Orlando Sentinel, Retrieved Feb. 20, 2019 from https://www.orlandosentinel.com/business/technology/os-bz-iitsec-preparation-simulators-20171106-story.html, 3 pages.
Wang, Robert Y. et al., "Real-time hand-tracking with a color glove," retrieved Dec. 16, 2014 from http://people.csail.mit.edu/rywang/hand/, 3 pages.
Yavrucuk, I. et al., "A Low Cost Flight Simulator Using Virtual Reality Tools," IEEE Aerospace and Electronics Systems Magazine, vol. 26, Issue 4, Apr. 2011, IEEE, pp. 10-14.
Non-Final Office Action for U.S. Appl. No. 14/501,509, dated Jul. 15, 2016, 8 pages.

* cited by examiner

US 10,748,440 B1

PROJECTORLESS SIMULATOR WITH ADJUSTABLE SIZE CANOPY

TECHNICAL FIELD

The embodiments relate generally to simulations, and in particular to a projectorless simulator that includes an adjustable size canopy.

BACKGROUND

Commercial simulators, such as flight simulators, are often relatively large systems that require a substantial amount of space. A flight simulator, for example, may include a large dome on which imagery is projected, and may include multiple projectors and image generators, which are costly, require a substantial amount of power, and generate a substantial amount of heat, which in turn increases environmental cooling requirements. As an example, one known flight simulator utilizes 25 projectors and requires a dome that is 20 feet in diameter, and utilizes 314 square feet of space. Such size requirements can limit the locations at which the simulator can be used. For example, it may be difficult to deploy such a simulator in a vehicle that has limited space, such as a ship.

The use of a dome may also require special focus adjustments to any heads-up display (HUD) apparatus used in the simulator to make the HUD apparatus focus at the distance of the dome, increasing simulator configuration complexity.

SUMMARY

The embodiments implement a projectorless simulator, which includes an adjustable size canopy that occupies relatively little space compared to conventional domed simulators, and whose size is field-adjustable.

In one embodiment, a projectorless simulator that includes an adjustable frame is disclosed. The adjustable frame defines an interior volume, and is adjustable in width and height to allow a shape of the interior volume to be varied. A chromakey screen is coupled to the adjustable frame to at least partially enclose the interior volume. A plurality of lights is mounted with respect to the adjustable frame. The plurality of lights is configured to emit light in a direction toward the chromakey screen.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first rail" and "second rail," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified.

The embodiments relate to a head-mounted display (HMD) device that automatically identifies a simulator cockpit located in front of the HMD device, and automatically determines where to place computer-generated imagery with respect to the simulator cockpit. The computer-generated imagery is overlaid on top of a real-world scene presented to a user by a display device. The computer-generated imagery may be cockpit imagery of a simulator cockpit, out-the-window (OTW) imagery, or a combination of cockpit imagery and OTW imagery. For example, computer-generated cockpit imagery may be generated and sent to the display system to overlay a portion of the simulator cockpit. Computer-generated OTW imagery may be generated and sent to the display system to overlay an OTW area of the simulator.

In some embodiments, the HMD device detects movements of the user, such as user movements to activate a cockpit control, and in response, generates computer-generated imagery based on the cockpit control activation, and overlays the computer-generated imagery on top of a real-world scene presented to the user. Among other advantages, the embodiments reduce the costs of simulators by simulating electronic components of a cockpit such that the simulator cockpit may be devoid of electronics, and in some embodiments, may eliminate the need for projectors that present OTW imagery to the user.

The embodiments also include a projectorless simulator that includes an adjustable size canopy that occupies relatively little space compared to conventional domed simulators and whose size is field-adjustable.

Figure 1:
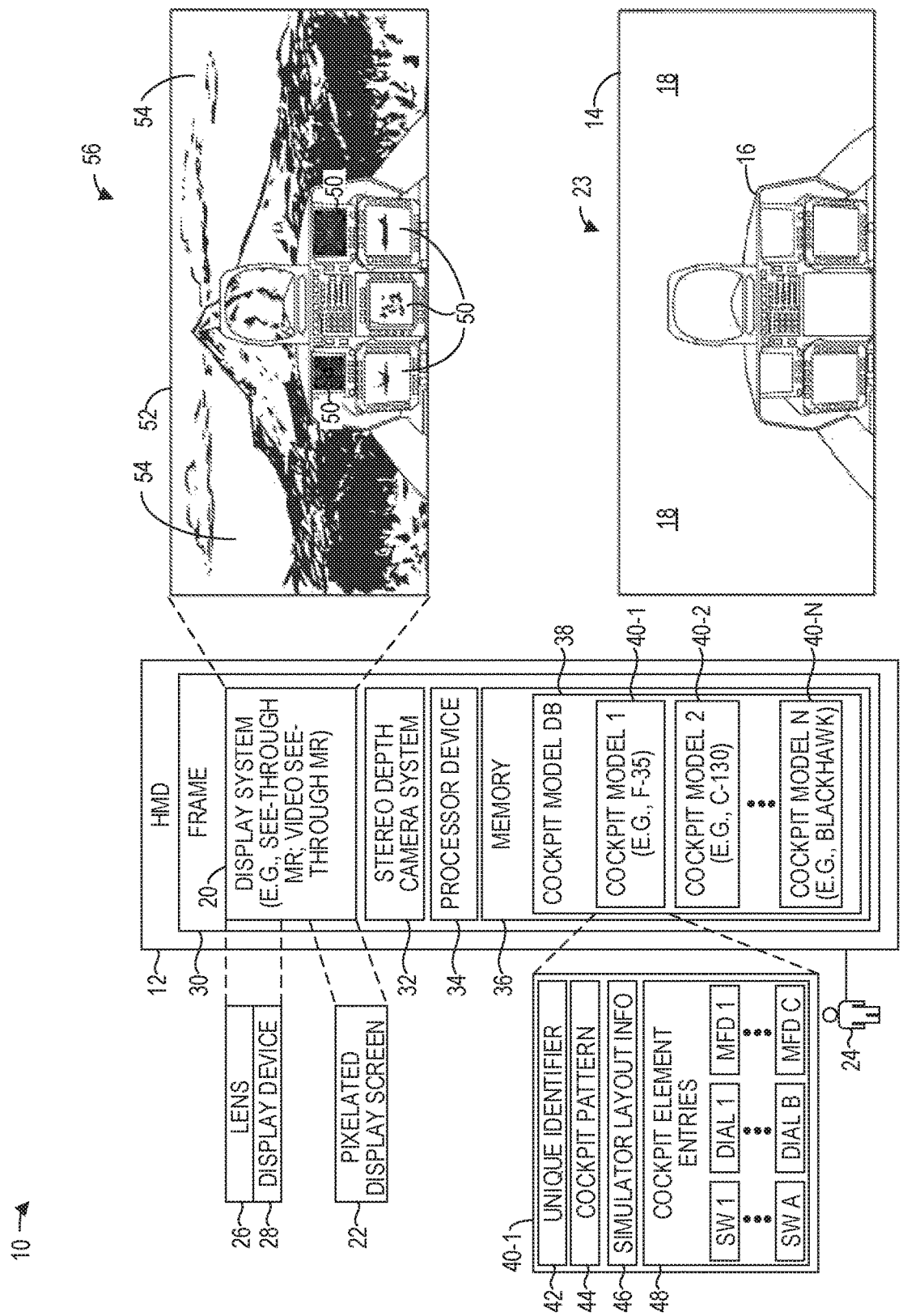
FIG. 1 is a block diagram of an environment in which embodiments may be practiced.

FIG. 1 is a block diagram of an environment 10 in which embodiments may be practiced. The environment 10 includes a head-mounted display (HMD) device 12 and a simulator 14. The simulator 14 includes a simulator cockpit 16, and an OTW area 18. The term "cockpit" as used herein refers to any instrument panel in any vehicle, whether an air vehicle, ground vehicle, or water vehicle. For example, the term "cockpit" as used herein encompasses the instrument panels and controls found in an airplane, a truck, a submarine, a ship, and the like. The HMD device 12 includes a display system 20. In a video see-through embodiment, the display system 20 includes a pixilated display screen 22 on which a mixture of real-world imagery of a real-world scene 23 and computer-generated imagery can be presented to a user 24. The phrase "real-world imagery" as used herein refers to substantially real-time imagery captured by a video camera (discussed below). The phrase "real-world scene" refers to the real world that is present about the user 24 from the perspective of the HMD device 12, and includes, for example, the simulator cockpit 16 and the OTW area 18.

In a see-through embodiment, the display system 20 includes a lens 26 and a display device 28. The lens 26 is transparent, thus presents at least a portion of the real-world scene 23 to the user 24, and has a reflective interior surface such that the display device 28 can project computer-generated imagery onto particular portions of the reflective interior surface to overlay the computer-generated imagery on top of portions of the real-world scene. In some embodiments, the display device 28 can be a liquid crystal display (LCD), liquid crystal on silicon (LCOS), or other suitable display device. The lens 26, in some embodiments, may be manufactured in accordance with the principles disclosed in U.S. Pat. No. 8,781,794, which is hereby incorporated by reference herein.

The HMD device 12 includes a frame 30 to which the display system 20 may be coupled or otherwise attached. The frame 30 includes a structure that is mountable to the head of the user 24. The structure may comprise, for example, a head strap or a pair of arms that extend on each side of the user 24's head and engage ears of the user 24. A stereo depth camera system 32 is coupled to the frame 30 and has a camera field-of-view (FOV) that defines a volume within the real-world scene 23 that can be perceived by the stereo depth camera system 32 at any instance in time. The stereo depth camera system 32 is configured to generate stereo depth camera information comprising frames of imagery of the real-world scene 23 within the camera FOV, and depth data that identifies a distance to things in the real-world scene 23, such as the simulator cockpit 16, for example. The stereo depth camera system 32 may comprise, for example, a ZED mini, available from Stereolabs Inc., 95 Federal Street, San Francisco, Calif. 94107, or any other suitable camera capable of generating imagery of a scene and depth data that that identifies a distance to things in the scene.

The HMD device includes, or is communicatively coupled to, a processor device 34. The processor device 34 is configured to implement much of the processing discussed herein. The processor device 34 is communicatively coupled to the display system 20 and the stereo depth camera system 32. The processor device 34 may be directly coupled to the frame 30, or in other embodiments, may be physically remote from the frame 30, such as in a same room as the simulator 14, and communicatively coupled to the display system 20 and the stereo depth camera system 32 wirelessly or via data communication cables.

The processor device 34 is communicatively coupled to a memory 36 that includes a cockpit model database 38. The cockpit model database 38 stores a plurality of cockpit models 40-1, 40-2-40-N (generally, cockpit models 40), each of which corresponds to a particular simulator cockpit 16. For example, the cockpit model 40-1 may correspond to a F-35 Joint Strike Fighter simulator cockpit 16, the cockpit model 40-2 to a C-130 simulator cockpit 16, and the cockpit model 40-N to a Blackhawk helicopter simulator cockpit 16. The memory 36 may also be physically coupled to the frame 30 or located elsewhere.

In some embodiments the cockpit model 40-1 may include a unique identifier (ID) 42. As discussed in greater detail below, the simulator cockpit 16 may bear indicia, and the processor device 34 may detect the indicia, and match the indicia to a corresponding unique ID 42 of a particular cockpit model 40. The cockpit model 40-1 may also include a cockpit pattern 44. As discussed in greater detail below, the processor device 34 may analyze a pattern of the elements of the simulator cockpit 16 detected in the stereo depth camera information generated by the stereo depth camera system 32 against the predetermined cockpit pattern 44 to determine that the cockpit model 40-1, for example, corresponds to the simulator cockpit 16.

The cockpit model 40-1 may also include simulator layout information 46 that identifies a structural layout of the simulator 14. The simulator layout information 46 may contain, for example, dimensional and location information regarding aspects of the simulator 14, such as the precise dimensions of the simulator cockpit 16 and the OTW area 18. Such information may be used by the processor device 34, for example, to appropriately position computer-generated OTW imagery and/or computer-generated cockpit imagery such that the computer-generated imagery is presented to the user 24 to properly overlay the computer-generated imagery on top of portions of the real-world scene 23.

The cockpit model 40-1 also includes a plurality of cockpit element entries 48. Cockpit element entries 48 correspond to particular features of the simulator cockpit 16, and may correspond to, for example, switches or dials located on the simulator cockpit 16, structural features of the simulator cockpit 16, and the like. The cockpit element entries 48 may contain state information for cockpit controls that correspond to the simulator cockpit 16, such as the position of a switch or dial, and may contain renderable data used to render imagery of the corresponding cockpit element. The cockpit element entries 48 may also include location information and dimensional information that identifies where on the simulator cockpit 16 the corresponding cockpit element is located, the size of the corresponding cockpit element, and any other information suitable and/or necessary for the processor device 34 to generate computer-generated imagery and cause the computer-generated imagery to overlay the computer-generated imagery on top of the real-world scene that depicts the corresponding cockpit element of the simulator cockpit 16. While not shown for purposes of simplicity, the other cockpit models 40-2-40-N contain similar information that corresponds to the particular actual cockpit to which the cockpit models 40-2-40-N correspond.

The simulator cockpit 16 may, for example, comprise a three-dimensional (3D) printed cockpit that accurately structurally simulates a particular cockpit of a corresponding vehicle, such as an aircraft. The 3D printed cockpit may include movable parts, such as a movable switch or dial, and areas for multi-function devices, such as touch-screen displays that, in the corresponding real cockpit, can both present information and receive input from a pilot. The simulator cockpit 16 may be completely devoid of any electronics.

Figure 2:
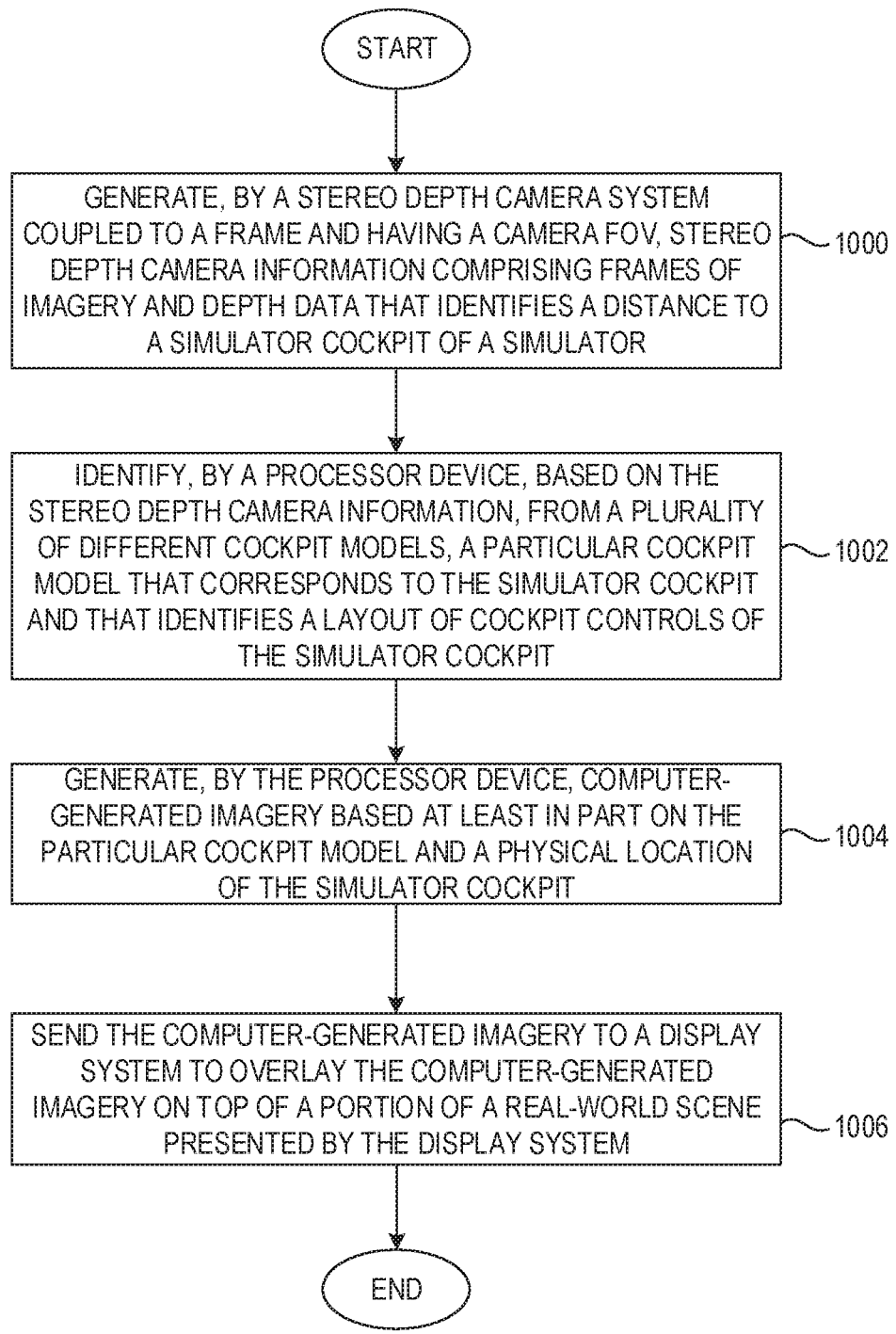
FIG. 2 is a flowchart of a method for automatic cockpit identification and augmented image placement according to one embodiment.

FIG. 2 is a flowchart of a method for automatic cockpit identification and augmented image placement according to one embodiment. FIG. 2 will be discussed in conjunction with FIG. 1. Assume that the user 24 sits in a seat (not illustrated) of the simulator cockpit 16 and faces the simulator cockpit 16. The stereo depth camera system 32, coupled to the frame 30, and which has a camera FOV, generates stereo depth camera information comprising frames of imagery of that portion of the real-world scene 23 within the camera FOV, and generates depth data that identifies a distance to the simulator cockpit 16 of the simulator 14 (FIG. 2, block 1000). The processor device 34 analyzes the stereo depth camera information and identifies, from the plurality of different cockpit models 40-1-40-N, the particular cockpit model 40-1 that corresponds to the simulator cockpit 16 (FIG. 2, block 1002). The cockpit model 40-1 identifies a layout of cockpit controls of the simulator cockpit 16. In one example, the processor device 34 may utilize pattern matching techniques to match patterns identified in the frames of imagery of the simulator cockpit 16 against the cockpit patterns 44 of the cockpit models 40. The processor device 34 generates computer-generated cockpit imagery 50 based at least in part on the cockpit model 40-1 and a physical location of the simulator cockpit 16 (FIG. 2, block 1004). The processor device 34 sends the computer-generated cockpit imagery 50 to the display system 20 to overlay the computer-generated cockpit imagery 50 on top of a portion of the real-world scene 23 presented by the display system 20 (FIG. 2, block 1006).

The embodiments work in conjunction with different types of simulators, and, as discussed previously, different types of display systems 20, such as see-through display systems 20 as well as video see-through display systems 20. In one embodiment, the simulator 14 may include a projection screen 52 that is positioned in front of the simulator cockpit 16. Projectors (not illustrated), may present on the projection screen 52 OTW imagery 54, as illustrated for example in a composite image 56 presented to the user 24 via the display system 20. The OTW imagery 54 simulates what a pilot would see outside of the simulator cockpit 16. In this embodiment, the OTW imagery 54 is part of the real-world scene 23 perceived by the display system 20 since the display system 20 does not generate the OTW imagery 54 in this embodiment. Thus, the display system 20 presents the real-world scene 23 which includes the OTW imagery 54 to the user 24, but overlays portions of the real-world scene 23 with the computer-generated cockpit imagery 50 at locations of the simulator cockpit 16 that correspond to cockpit controls, such that the user 24 perceives what appears to be an actual operating cockpit.

In other examples, the simulator 14 may not include the projection screen 52, and the processor device 34, based on the simulator layout information 46 and the determined location of the simulator cockpit 16 based on the stereo depth camera information, may generate computer-generated OTW imagery. The processor device 34 overlays the real-world scene 23 with the computer-generated OTW imagery as well as with the computer-generated cockpit imagery 50.

In other examples, the simulator 14 includes the screen 52, and one or more lights, such as infrared (IR) lights, either front or rear projected, illuminate the projection screen 52. The processor device 34 detects the IR wavelengths via the imagery provided by the stereo depth camera system 32, or, in some embodiments, via additional IR sensors/camera(s) coupled to the frame 30, generates the computer-generated OTW imagery 54, and overlays the computer-generated OTW imagery 54 on top of the IR imagery for presentation to the user 24.

In a video see-through embodiment, the processor device 34 receives real-world imagery of the real-world scene 23 via the stereo depth camera system 32. In some examples, the processor device 34 may process the real-world imagery prior to presenting any of the real-world imagery on the display screen 22 to ensure that the real-world imagery is a more accurate depiction of what would be seen by the user 24 if the display screen 22 were transparent. For example, the processor device 34 may warp the real-world imagery to adjust (or compensate) for various optical components, such as optical components of the stereo depth camera system 32, and/or the real-world imagery may be transformed to account for a difference in FOV between the eyes of the user 24 and that of the stereo depth camera system 32.

In some embodiments, the processor device 34 processes the real-world imagery by re-projecting the real-world imagery into three-dimensional space 1) to account for a difference in the location of the stereo depth camera system 32 and the eyes of the user 24, 2) to account for differences in FOV of the stereo depth camera system 32 and the eyes of the user 24, 3) to correct for warp and color shift from the optics of the stereo depth camera system 32 and the optics of the display screen 22, 4) to account for head movement of the user 24 during the brief interval of time since the real-world imagery was captured, and 5) to account for predicted head movement of the user 24 during the time it takes for the display screen 22 to display the image.

The processor device 34 generates computer-generated imagery, such as computer-generated OTW imagery and/or computer-generated cockpit imagery, and overlays portions of the processed real-world imagery to generate augmented imagery that includes the real-world imagery and the computer-generated imagery. The processor device 34 sends the augmented imagery to the display screen 22. The locations of the computer-generated imagery within the real-world imagery is based on the cockpit model 40-1 and the actual location, including distance, of the simulator cockpit 16 from the head of the user 24, as determined, for example, via the stereo depth camera information. Note that the stereo depth camera system 32 generates the stereo depth camera information at a particular rate, such as 30, 60, or 120 frames per second, continuously during the simulation.

In a see-through embodiment, the user 24 is presented with the real-world scene 23 directly through the lens 26. The processor device 34 still receives real-world imagery of the real-world scene 23 via the stereo depth camera system 32. The processor device 34 generates computer-generated imagery, such as computer-generated OTW imagery and/or computer-generated cockpit imagery, and causes the display device 28 to reflect the computer-generated imagery off of portions of the interior surface of the lens 26 such that the computer-generated imagery overlays portions of the real-world scene to generate augmented imagery. The locations on the interior surface of the lens 26 of the computer-generated imagery are based on the cockpit model 40-1 and the actual location, including distance, of the simulator cockpit 16 from the head of the user 24, as determined, for example, via the stereo depth camera information.

Figure 3:
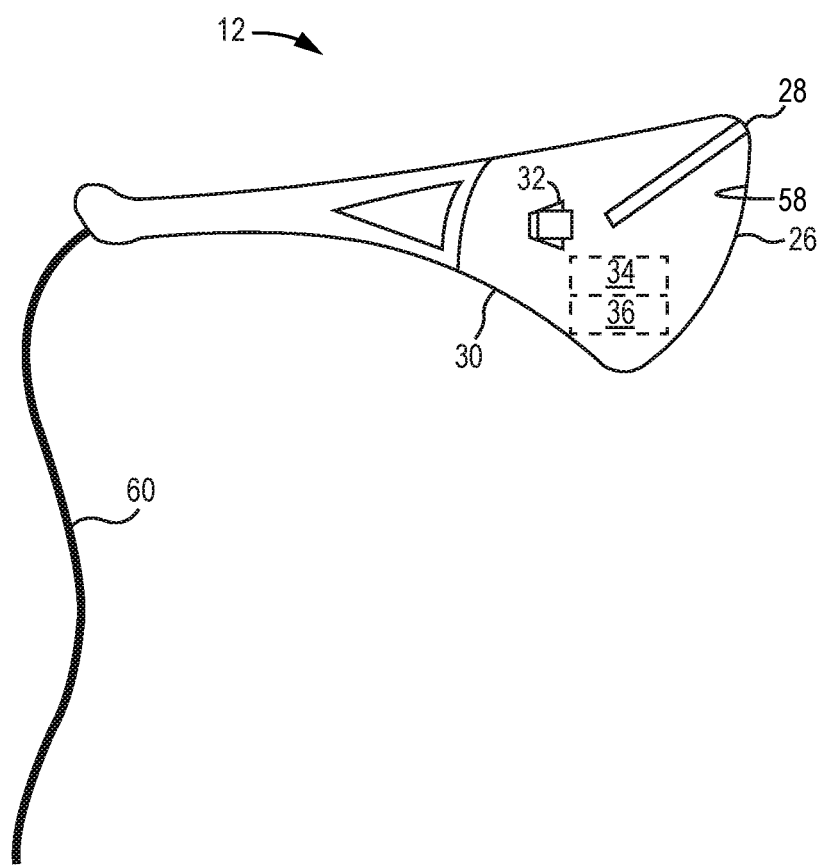
FIG. 3 is a side view of a see-through head-mounted display (HMD) device according to one embodiment.

FIG. 3 is a side view of a see-through HMD device 12 according to one embodiment. The HMD device 12 includes the frame 30. The frame 30 has the stereo depth camera system 32, which in this example includes two cameras, one on each side of the frame 30 (only one illustrated). The display device 28 is coupled to the frame 30, and projects computer-generated imagery onto an interior surface 58 of the lens 26. In one embodiment, embedded within or attached to the frame 30 are the processor device 34 and the memory 36. In other embodiments, the processor device 34 and the memory 36 may be remote from the frame 30, but communicatively coupled to the stereo depth camera system 32 and display device 28 wirelessly, or via a communications cable 60.

Figure 4A:
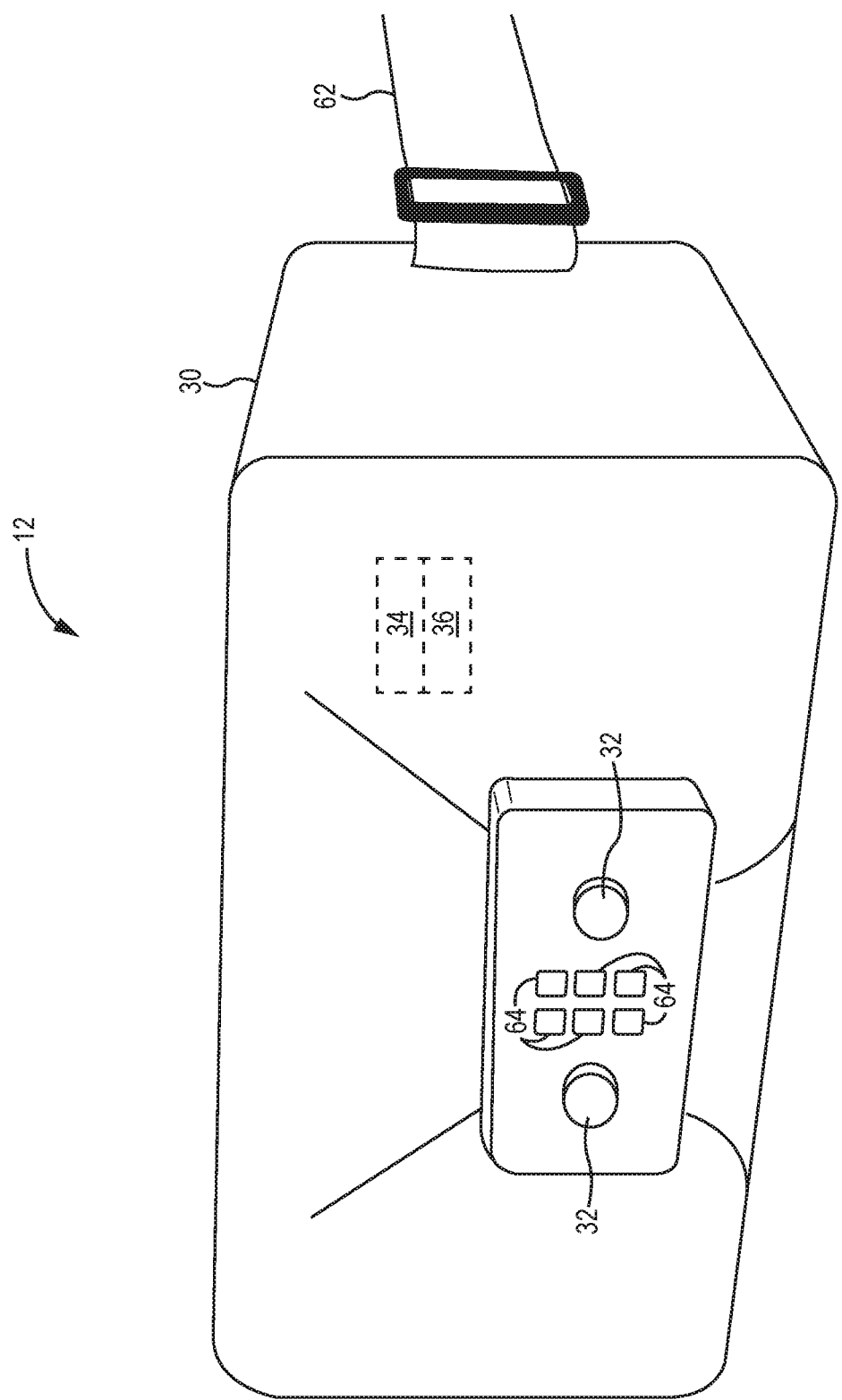
FIGS. 4A-4B are perspective views of a video see-through HMD device according to one embodiment.
Figure 4B:
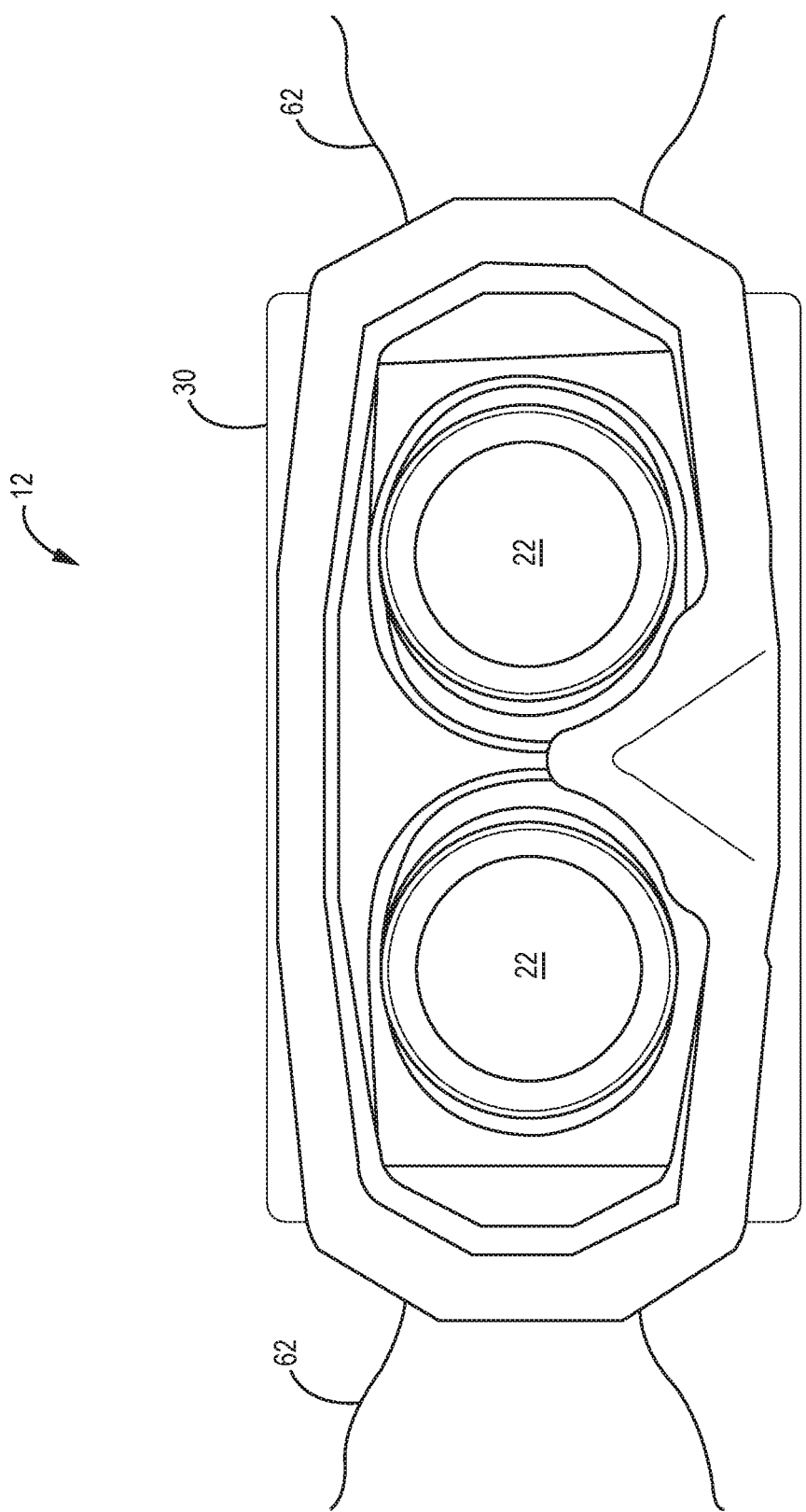

FIGS. 4A-4B are perspective views of a video see-through HMD device 12 according to one embodiment. FIG. 4A illustrates the frame 30, which in this embodiment includes a head strap 62 for fixing the HMD device 12 to the head of the user 24. In this embodiment, the stereo depth camera system 32 includes two separate cameras. A plurality of IR sensors 64 are also coupled to the frame 30. The IR sensors 64 may be used, for example, to gather depth information. In one embodiment, embedded within or attached to the frame 30 are the processor device 34 and the memory 36. In some embodiments, the video see-through HMD device 12 may include additional cameras, such as one or more wide FOV cameras that have a wider FOV than that of the stereo depth camera system 32. In such embodiments, real-world imagery received from each of the various cameras may be merged together to generate real-world imagery within a relatively wide FOV that can be presented to the user 24.

FIG. 4B illustrates the reverse side of the video see-through HMD device 12 that fits over the face of the user 24. In this embodiment, the user 24 views real-world imagery and computer-generated imagery presented on the display screen 22 contained in an interior of the HMD device 12.

Figure 5:
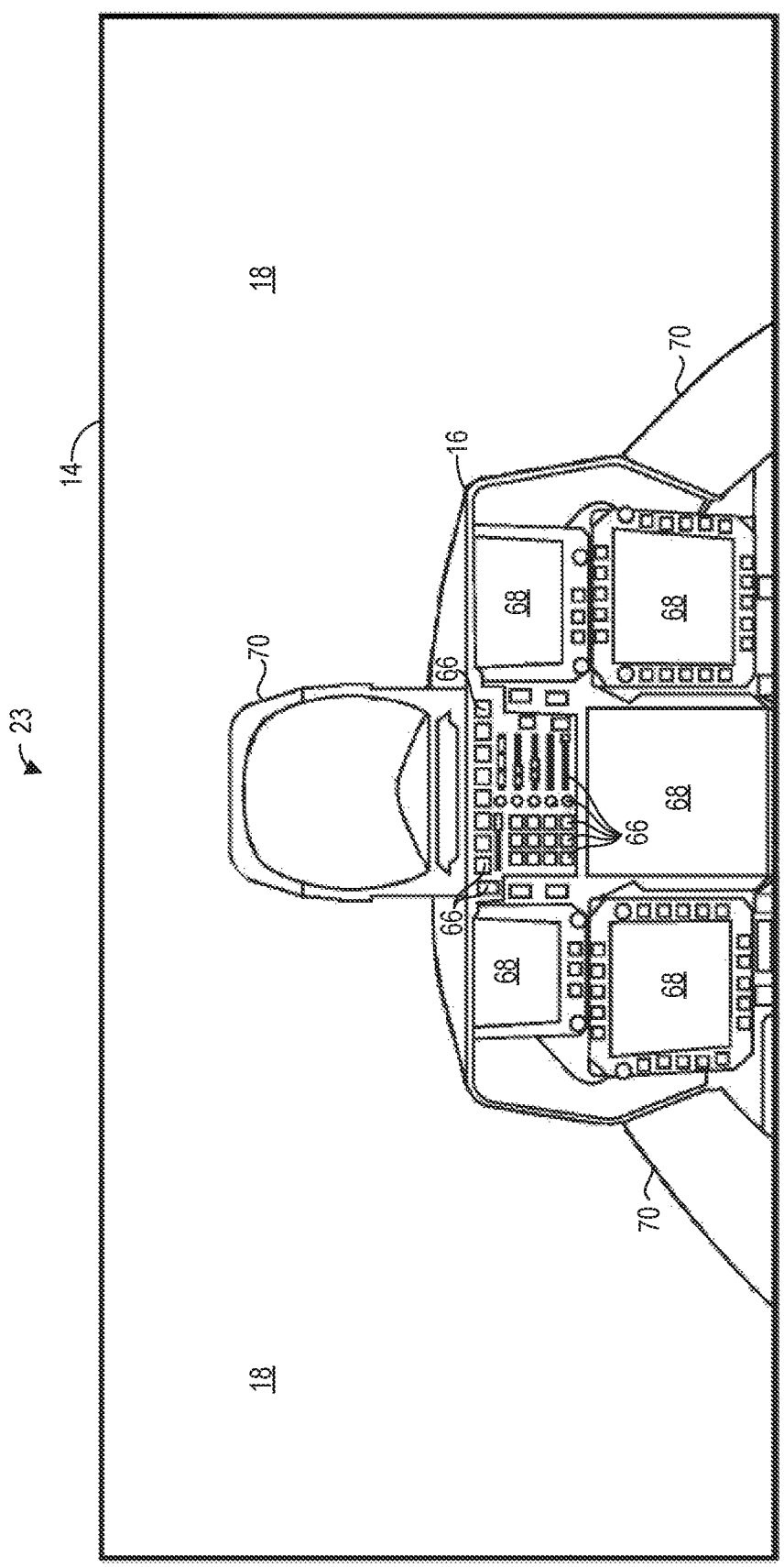
FIG. 5 illustrates the simulator cockpit illustrated in FIG. 1.

FIG. 5 illustrates the simulator cockpit 16 illustrated in FIG. 1. The simulator cockpit 16 includes a plurality of simulated controls, including simulated buttons/switches/dials 66, and simulated multi-function displays (MFDs) 68. The simulator cockpit 16 may be devoid of any electronics. Some or all of the buttons/switches/dials 66 may be movable, such as being rotatable, being able to slide, being able to toggle between two positions, being depressed, or the like, to realistically simulate the movement of cockpit controls in an actual cockpit. The user 24 sits in a cockpit seat (not illustrated) and faces the simulator cockpit 16. The stereo depth camera system 32 generates the stereo depth camera information. The processor device 34, in one embodiment, may utilize the stereo depth camera information to generate a cockpit pattern based on the layout of the simulator cockpit 16. The cockpit pattern may be based on, for example, the shape of a perimeter 70, the locations of the MFDs 68, the locations and shapes of the buttons/switches/dials 66, and the like. The processor device 34 may then compare the generated cockpit pattern to the predetermined cockpit patterns 44 stored in the cockpit models 40 to automatically, without human involvement, identify the particular cockpit pattern 44 of the cockpit model 40-1 as matching the simulator cockpit 16. Based on the cockpit model 40-1, and the continuously received stereo depth camera information, the processor device 34 can generate computer-generated imagery and cause the computer-generated imagery to overlay desired portions of the real-world scene 23 that would otherwise be presented to the user 24.

Figure 6:
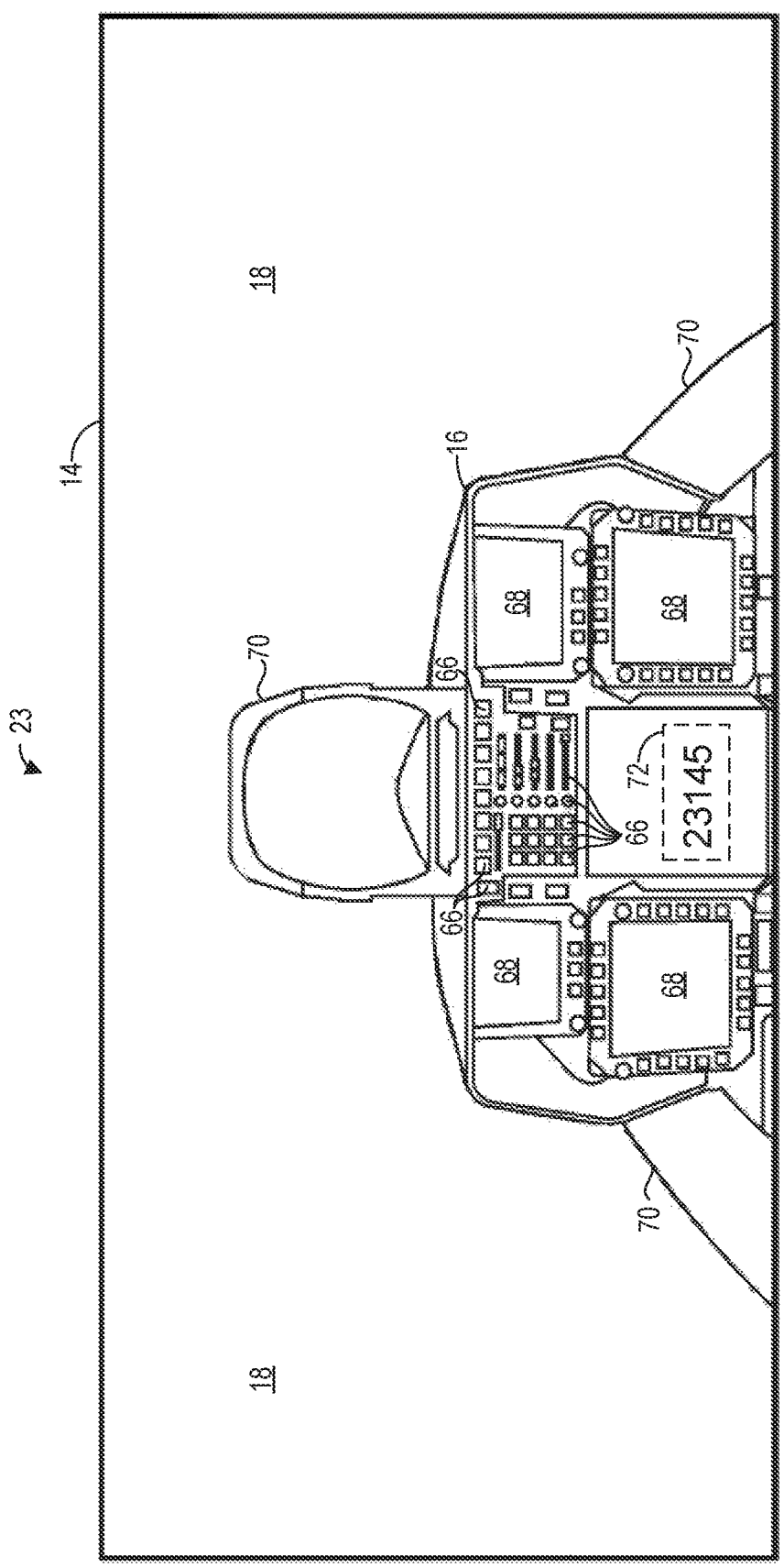
FIG. 6 illustrates the simulator cockpit illustrated in FIG. 1 according to another embodiment.

FIG. 6 illustrates the simulator cockpit 16 illustrated in FIG. 1 according to another embodiment. The simulator cockpit 16 is substantially identical to the cockpit 16 illustrated in FIGS. 1 and 5 except as otherwise noted herein. In this embodiment, the simulator cockpit 16 bears indicia 72. The indicia 72 may be any type of identifier, including, for example, a bar code, an alphanumeric sequence, a quick response (QR) code, or the like. The stereo depth camera system 32 generates the stereo depth camera information which comprises frames of imagery. The processor device 34 identifies the indicia 72 in the imagery, and compares the indicia 72 to the unique IDs 42 stored in the cockpit models 40 to automatically, without human involvement, identify the particular unique ID 42 of the cockpit model 40-1 as matching the indicia 72. Based on the cockpit model 40-1, and the continuously received stereo depth camera information, the processor device 34 can generate computer-generated imagery and cause the computer-generated imagery to overlay desired portions of the real-world scene 23 that would otherwise be presented to the user 24.

Figure 7:
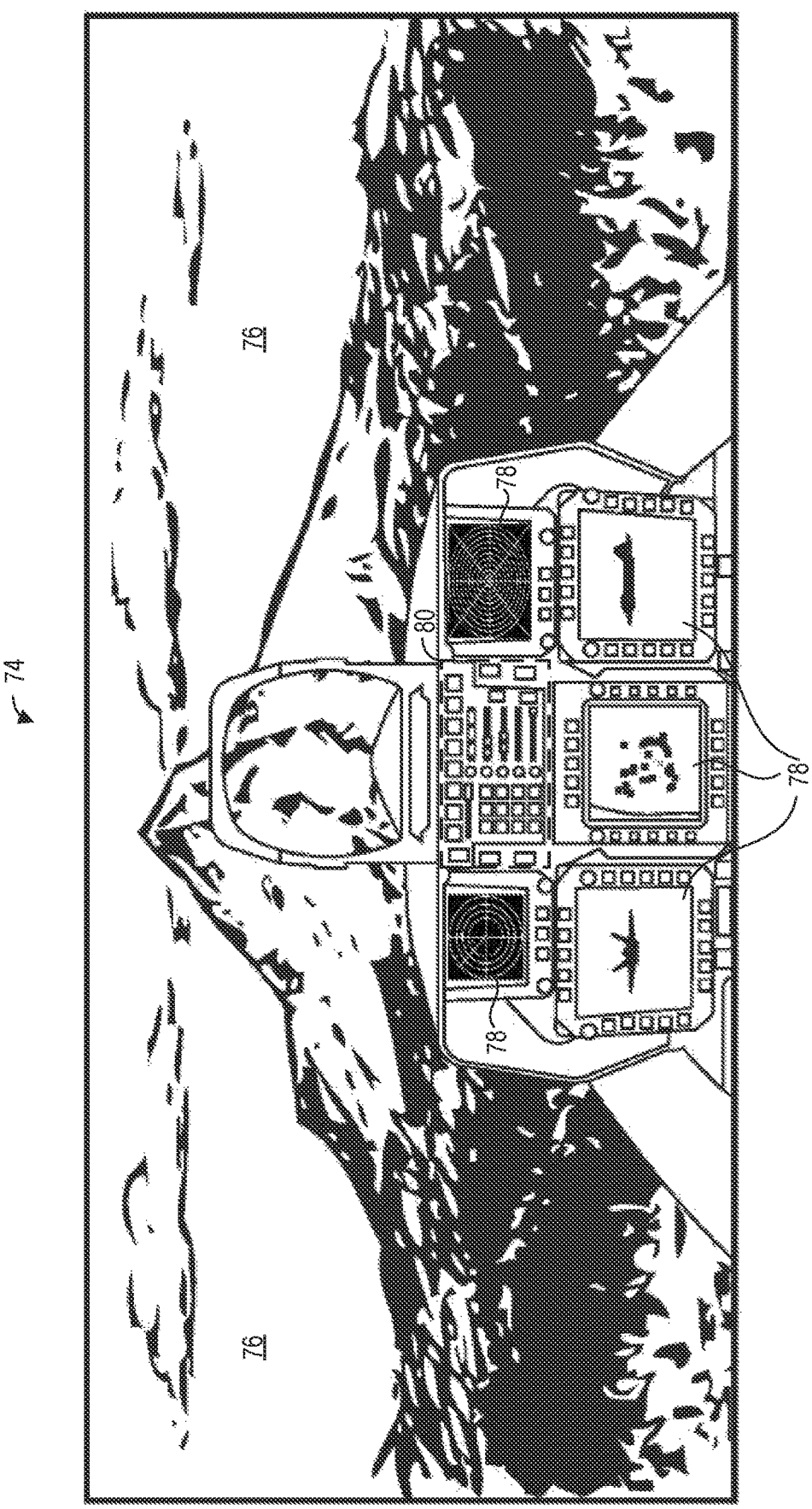
FIG. 7 illustrates a view during a simulation that may be presented by a display system to a user according to one embodiment.

FIG. 7 illustrates a view 74 during a simulation that may be presented by the display system 20 to the user 24 according to one embodiment. The portions of the view 74 that are part of the real-world scene and the portions of the view 74 that are computer-generated imagery may differ depending on the particular system. For example, as discussed above, an OTW portion 76 may be, in one example, computer-generated OTW scenery that is generated by the processor device 34. In other examples, the OTW portion 76 may be imagery that is presented on a screen, such as a domed screen, via external projectors. In such examples, to the HMD device 12, the OTW portion 76 is a part of the real-world scene and is passed to the user 24 without modification and without overlaying computer-generated imagery on top of the OTW portion 76 by the processor device 34.

In some embodiments, cockpit portions 78, for example, may be computer-generated cockpit imagery generated by the processor device 34 and overlaid on top of the corresponding cockpit controls of the simulator cockpit 16. Other portions of the simulator cockpit 16, such as a cockpit portion 80, may be presented by the display system 20 as is, without the overlay of any computer-generated imagery. The particular OTW and cockpit portions that are to be overlaid with computer-generated imagery may be, for example, identified in the corresponding cockpit model 40. Thus, for a first simulator cockpit 16, the processor device 34 may generate computer-generated OTW imagery, but allow the user 24 to view the simulator cockpit 16 as part of the real-world scene. For a second simulator cockpit 16, the processor device 34 may generate computer-generated cockpit imagery, but allow the user 24 to view the OTW area 18 as part of the real-world scene. For a third simulator cockpit 16, the processor device 34 may generate computer-generated OTW imagery and computer-generated cockpit imagery.

Figure 8:
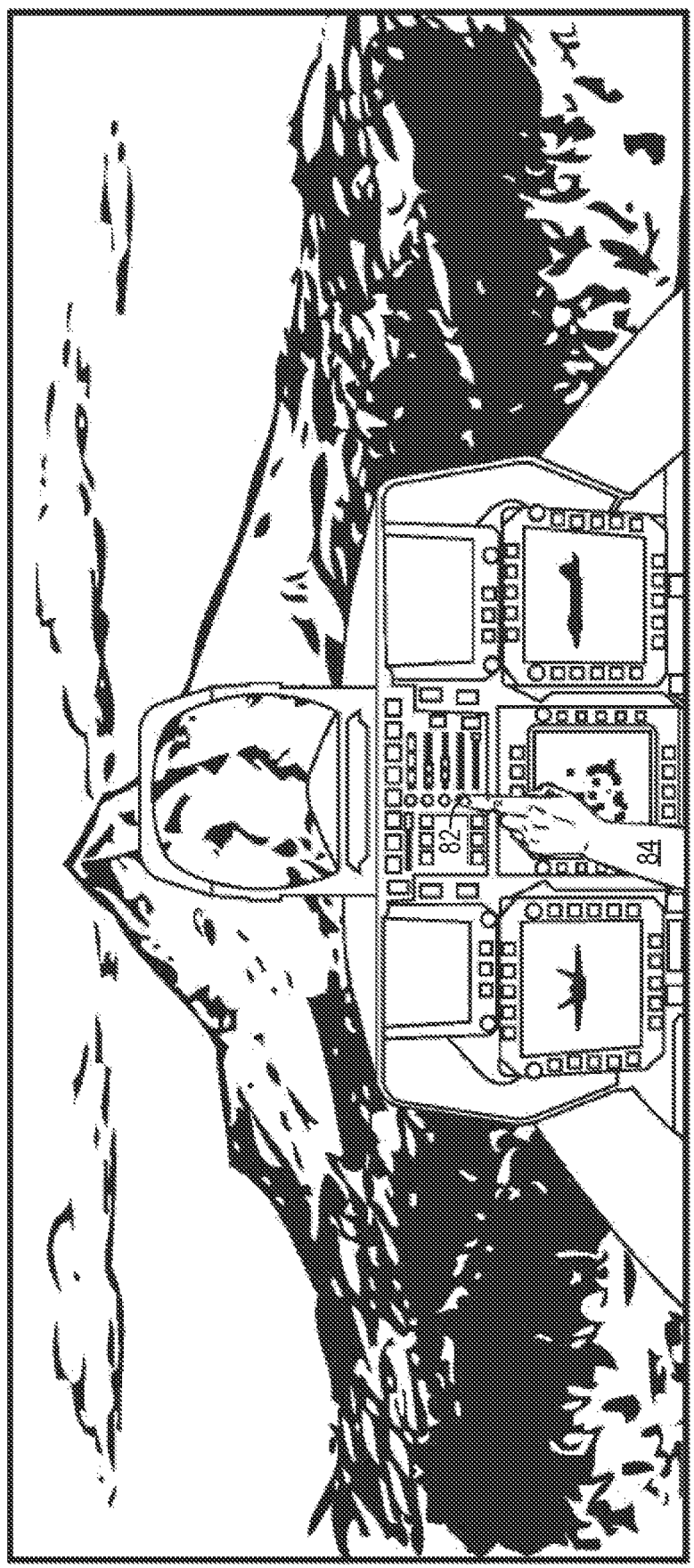
FIG. 8 illustrates a view during a simulation that may be presented by the display system to the user according to another embodiment.

FIG. 8 illustrates a view during a simulation that may be presented by the display system 20 to the user 24 according to another embodiment. In this embodiment, the user 24 touches a cockpit control 82 of the simulator cockpit 16. The processor device 34 detects the movement of an arm 84 and hand of the user 24 into the scene that is within the FOV of the display system 20, and, in one embodiment, may dynamically generate a mask that is coextensive with the arm 84 and hand of the user 24 to inhibit the overlay of computer-generated imagery on top of the arm 84 and hand such that the user 24 can see their own arm and hand via the display system 20.

The processor device 34, based on the imagery generated by the stereo depth camera system 32 and based on the cockpit model 40-1, determines that a particular cockpit control has been contacted by the user 24. In this example, assume that the cockpit control contacted by the user 24 is a cockpit control for which the processor device 34 generates computer-generated cockpit imagery. The processor device 34 then alters the computer-generated cockpit imagery to show the cockpit control as being activated, such as rotated, depressed, or the like.

Figure 9:
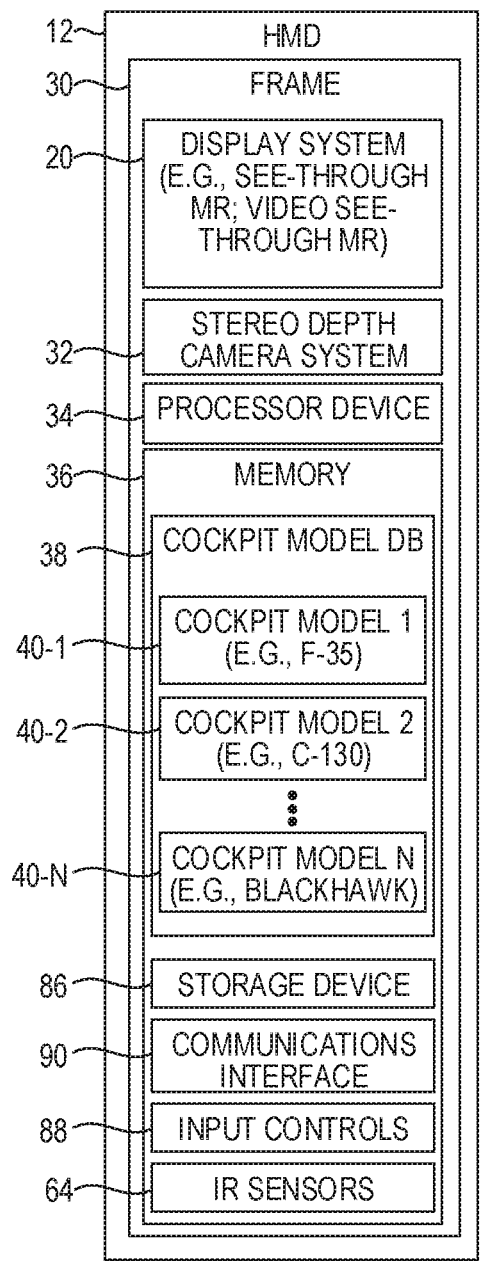
FIG. 9 is a block diagram of an HMD device according to one embodiment.

FIG. 9 is a block diagram of the HMD device 12 illustrated in FIG. 1 showing additional components according to one embodiment. The HMD device 12 may include a storage device 86, which provides non-volatile storage of data, data structures, computer-executable instructions, and the like. The storage device 86 may include, for example, the cockpit model database 38, and a computer program product that includes complex programming instructions, such as complex computer-readable program code, to cause the processor device 34 to carry out the steps described herein. Thus, the computer-readable program code can comprise software instructions for implementing the functionality of the embodiments described herein when executed on the processor device 34.

The HMD device 12 may also include one or more input controls 88, such as buttons, via which the user 24 can interface with the HMD device 12. The input controls 88 may, for example, allow the user 24 to set certain configuration options of the HMD device 12. In one embodiment, the processor device 34, after determining the particular cockpit model 40 of the plurality of cockpit models 40, as discussed above, may generate information that identifies the cockpit model 40 that was selected and present the information via the display system 20, and allow the user 24 to confirm or reject the selection.

The HMD device 12 may also include one or more communications interfaces 90 to facilitate communications with other devices in a simulation system. For example, in a simulation system where another computing device generates OTW imagery and presents such OTW imagery on a screen, the HMD device 12 may communicate with such other computing device to identify the manipulation of cockpit controls which may alter the OTW imagery that is presented on the screen. For example, if the user 24 rotates a control wheel to alter the direction of the aircraft, the OTW imagery will change to reflect the change in direction.

Figure 10:
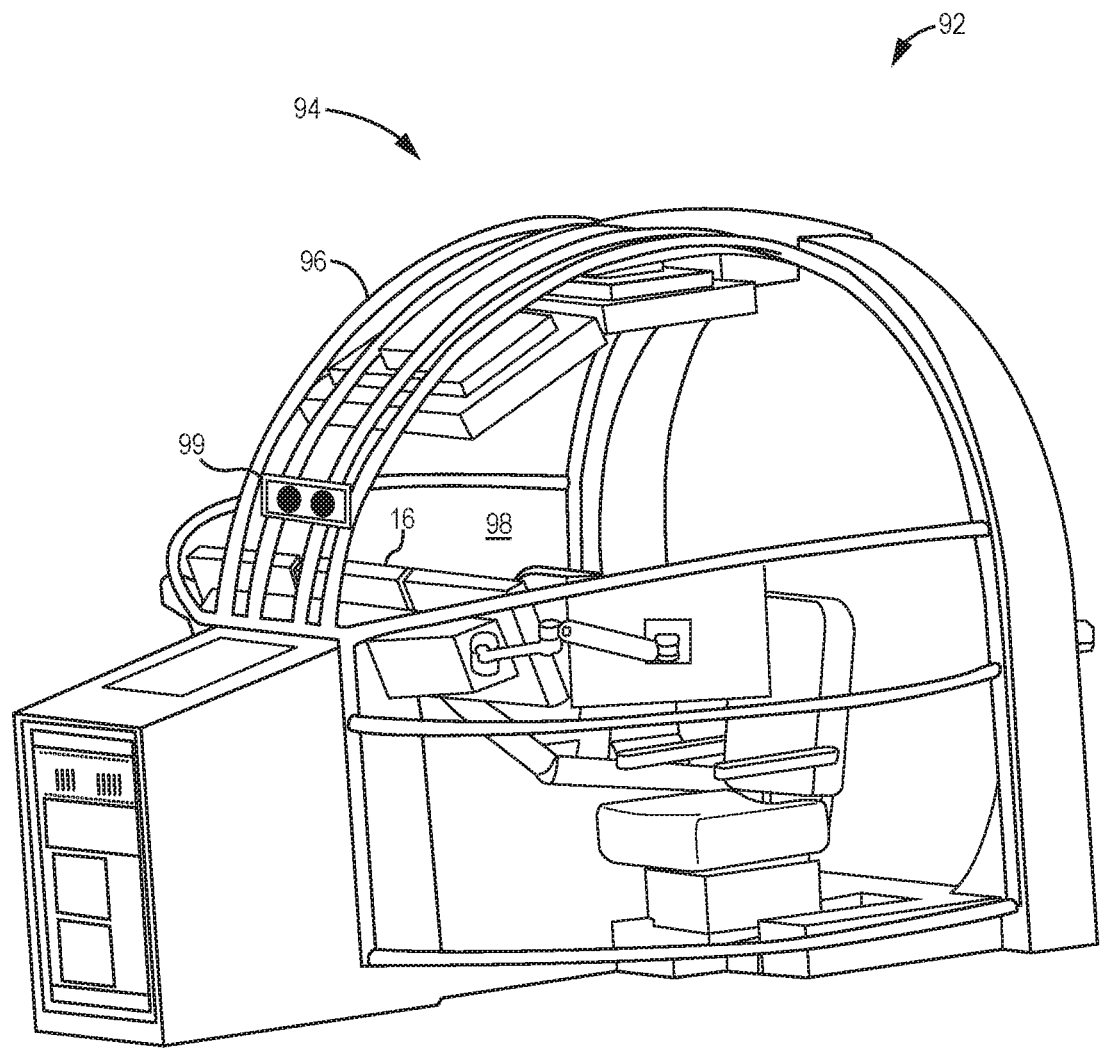
FIG. 10 is a perspective view of a projectorless simulator that includes an adjustable size canopy according to one embodiment.

FIG. 10 is a perspective view of a projectorless simulator 92 that includes an adjustable size canopy 94 according to one embodiment. The adjustable size canopy 94 includes an adjustable frame 96 that defines an interior volume 98. The adjustable frame 96 is adjustable in width, height, and length to allow a shape of the interior volume 98 to be varied to simulate the interior of any desired vehicle, such as, by way of non-limiting example, a single-person cockpit, a multiple-person cockpit, or the like. A chromakey screen (not illustrated in FIG. 10) is coupled to the adjustable frame 96 to at least partially enclose the interior volume 98, and a plurality of lights (not illustrated in FIG. 10) is mounted with respect to the adjustable frame 96. The plurality of lights is configured to emit light, such as infrared light in a desired wavelength or wavelength band, in a direction toward the chromakey screen. The projectorless simulator 92 may include the simulator cockpit 16, which may be portable, and the user(s) 24 or participant(s) may use the HMD device 12. In some embodiments, the projectorless simulator 92 includes an observer (e.g., instructor) camera 99 that is configured to capture real-time imagery of an observer who is located in the environment external to the projectorless simulator 92. As will be discussed in greater detail below, the video generated by the observer camera 99 may be combined with computer generated simulation imagery seen by a participant in the projectorless simulator 92 to provide the participant with real-time instruction from the observer during a simulation.

Figure 11:
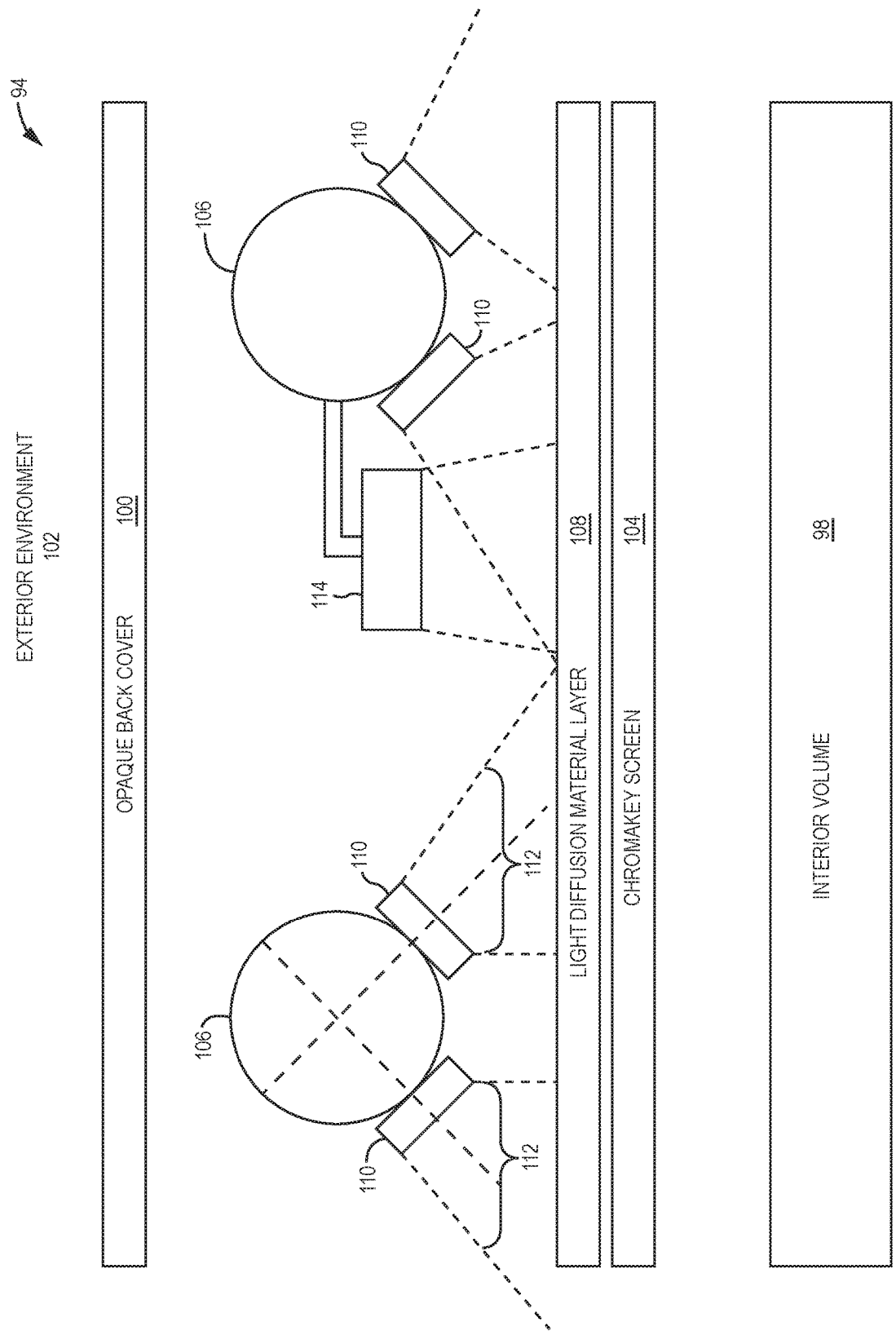
FIG. 11 is a schematic diagram of a cross-section of the adjustable size canopy according to one embodiment.

FIG. 11 is a schematic diagram of a cross-section of the adjustable size canopy 94 according to one embodiment. The adjustable size canopy 94 includes a back cover 100 that comprises an opaque material. In some embodiments, the back cover 100 is a dense material such as canvas, or the like. The back cover 100 is configured to be placed around the adjustable frame 96 to inhibit light from an exterior environment 102 from impinging on a chromakey screen 104. The adjustable frame 96 includes a plurality of frame members 106. While the frame members 106 are illustrated as having a circular cross-section, the frame members 106 may have cross-sections of any shape. A light diffusion material layer 108 surrounds the chromakey screen 104 and is positioned between the chromakey screen 104 and a plurality of lights 110 that are coupled, fixed, or otherwise attached to the frame members 106. The light diffusion material layer 108 serves to diffuse light emitted from the plurality of lights 110 to help spread the light across the chromakey screen 104. In some embodiments, the light diffusion material layer 108 comprises a white translucent and/or a semi-transparent fabric, such as a thin nylon, or the like. While for purposes of illustration the light diffusion material layer 108 is illustrated as being spaced a distance from the chromakey screen 104, in other embodiments, the light diffusion material layer 108 may be positioned immediately adjacent to the chromakey screen 104.

In some embodiments, the lights 110 emit IR electromagnetic radiation (EMR) onto the chromakey screen 104 (through the light diffusion material layer 108). The HMD device 12 can detect the IR EMR that is emitted by the chromakey screen 104 into the interior volume 98 and, based on where the IR EMR is detected, determine what portions within a field of view of the camera are to be overlaid with computer-generated imagery and provided to the participant.

The lights 110 may be positioned with respect to the frame members 106 at a mean average angle to ensure that a maximum field of view (FOV) 112 is projected onto the light diffusion material layer 108. The lights 110 may be positioned along a length of each frame member 106 and thereby may be positioned completely about the chromakey screen 104. The lights 110 may be physically attached to an exterior surface of the frame members 106, as illustrated, or embedded within the frame members 106 to conform with a uniform external surface of the frame members 106.

One or more IR tracking sensors 114 may be attached at desired locations along one or more frame members 106. The IR tracking sensors 114 are configured to emit IR EMR through the chromakey screen 104 to detect movement of a user 24 within the interior volume 98. The IR tracking sensors 114 may be communicatively coupled to the HMD device 12. The IR tracking sensors 114 may be configured to detect movement of a head of the user 24, and thereby, in conjunction with the HMD device 12, determine what imagery should be computer generated and provided to the user 24. One or more of the IR tracking sensors 114 may also be configured to detect movement of a hand or hands of the user 24, and thereby determine that the user 24 has manipulated a cockpit control on the simulator cockpit 16.

Figure 12:
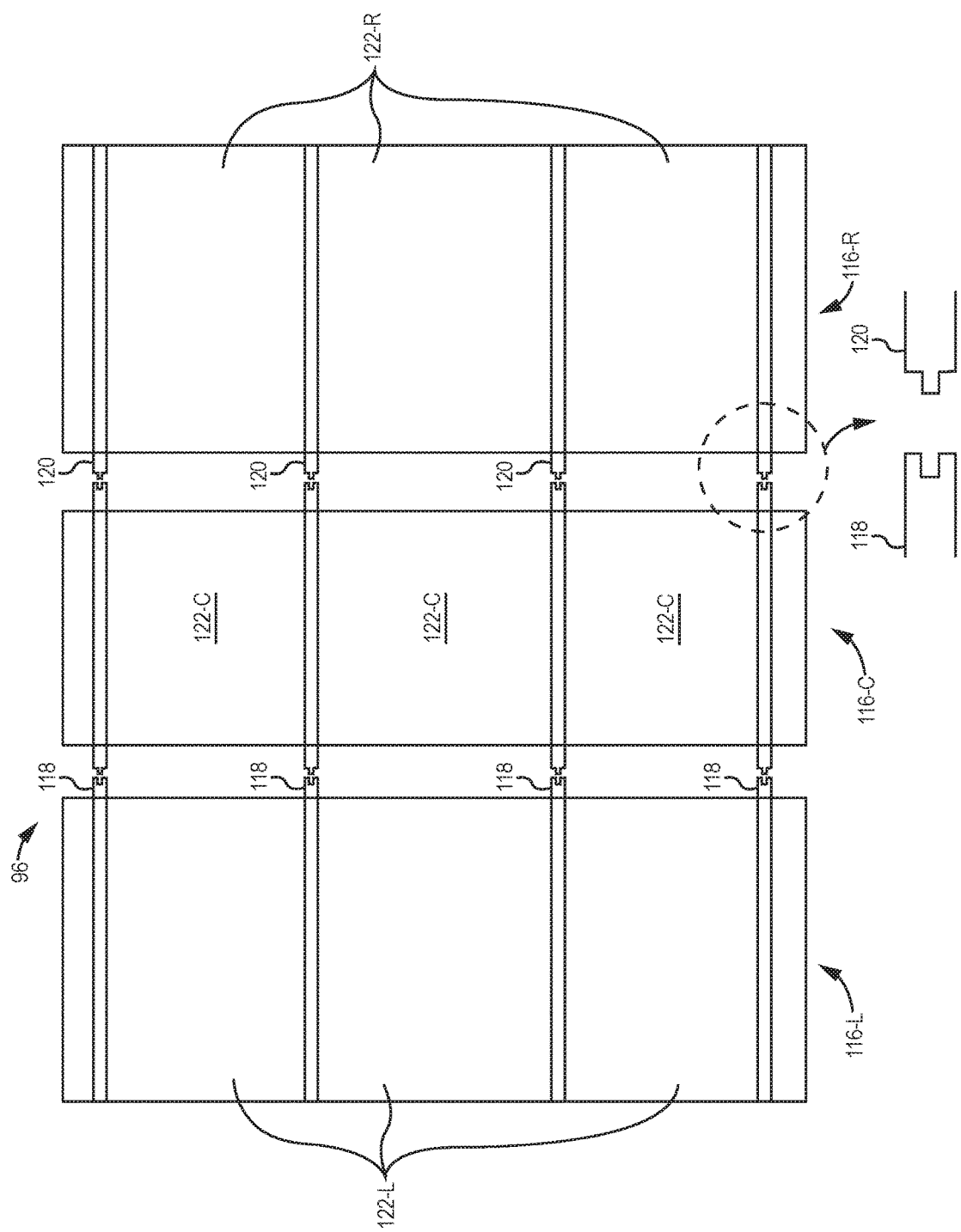
FIG. 12 is a schematic diagram of the adjustable size canopy according to one embodiment.

FIG. 12 is a schematic diagram of the adjustable size canopy 94 according to one embodiment. In this embodiment, the adjustable frame 96 includes a left frame portion 116-L, a center frame portion 116-C, and a right frame portion 116-R (generally, frame portions 116). The left frame portion 116-L has a plurality of connectors 118 having a plurality of connectors configured to couple to the center frame portion 116-C or the right frame portion 116-R, and the right frame portion 116-R has a plurality of connectors 120 configured to couple to the center frame portion 116-C or the left frame portion 116-L. While only one center frame portion 116-C is illustrated, any number of center frame portions 116-C may be inserted between the left frame portion 116-L and the right frame portion 116-R to make the adjustable frame 96 any desired size.

Similarly, the chromakey screen 104 comprises left screen portion 122-L, a center screen portion 122-C, and a right screen portion 122-R (generally, screen portions 122). Each of the screen portions 122 may include the light diffusion material layer 108 and a layer of the chromakey screen 104. Each screen portion 122 may be pre-coupled to a corresponding frame portion 116.

Figure 13A:
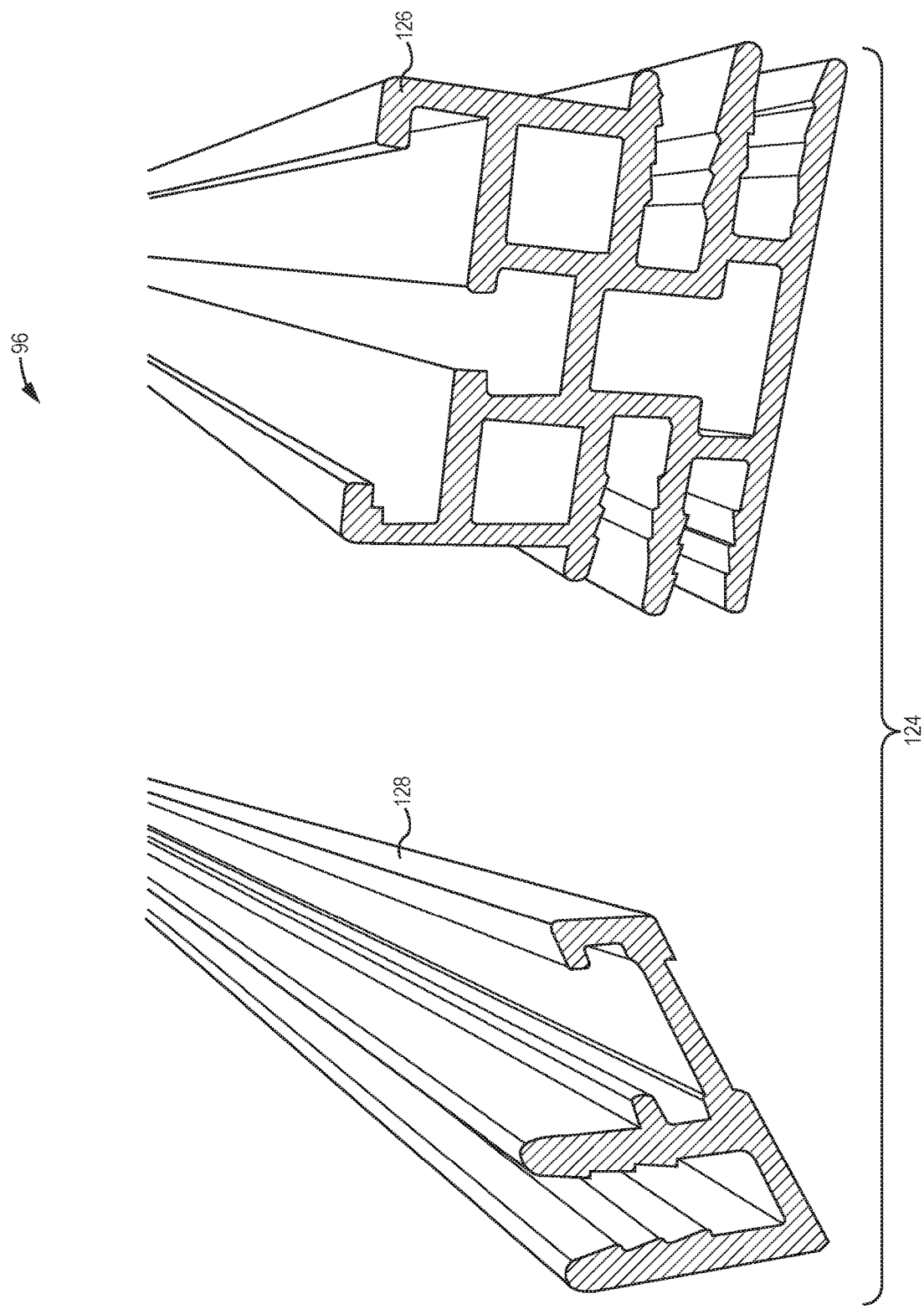
FIGS. 13A-13B are perspective views of a portion of an adjustable frame according to another embodiment.

FIG. 13A is a perspective view of another embodiment of the adjustable frame 96. The adjustable frame 96 includes a plurality of adjustable length frame members 124, each frame member 124 including a first rail 126 that is configured to slidably engage a second rail 128 to allow the adjustable length frame member 124 to be adjusted to a desired length. Sets of the lights 110 are coupled to either the first rail 126 or the second rail 128.

Figure 13B:
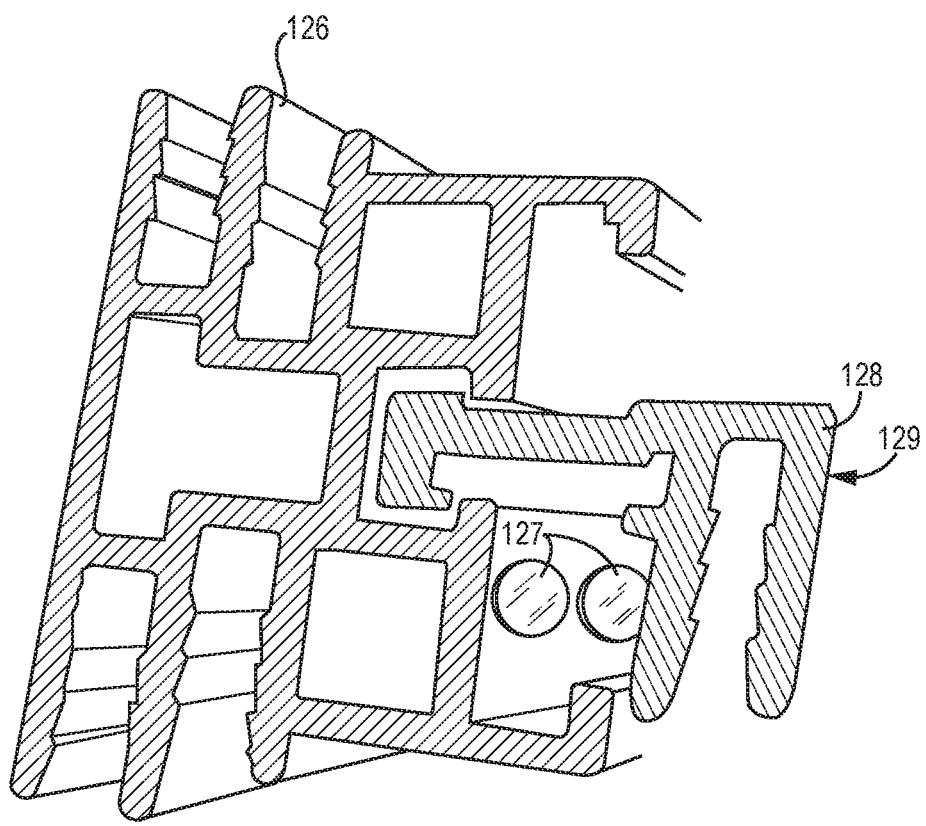

FIG. 13B is a perspective view illustrating the first rail 126 slidably engaging the second rail 128. In this embodiment, a row of lights 127 are positioned on a surface of the first rail 126. The lights 127 may extend along the entire first rail 126. The lights 127 may also be positioned on a surface 129 of the second rail 128. The second rail 128 may be a relatively small segment used to join multiple first rails 126 together, in some embodiments. Where the second rail 128 may overlap the lights 127 positioned on the first rail 126, additional lights 127 may be provided on the surface 129.

Figure 14:
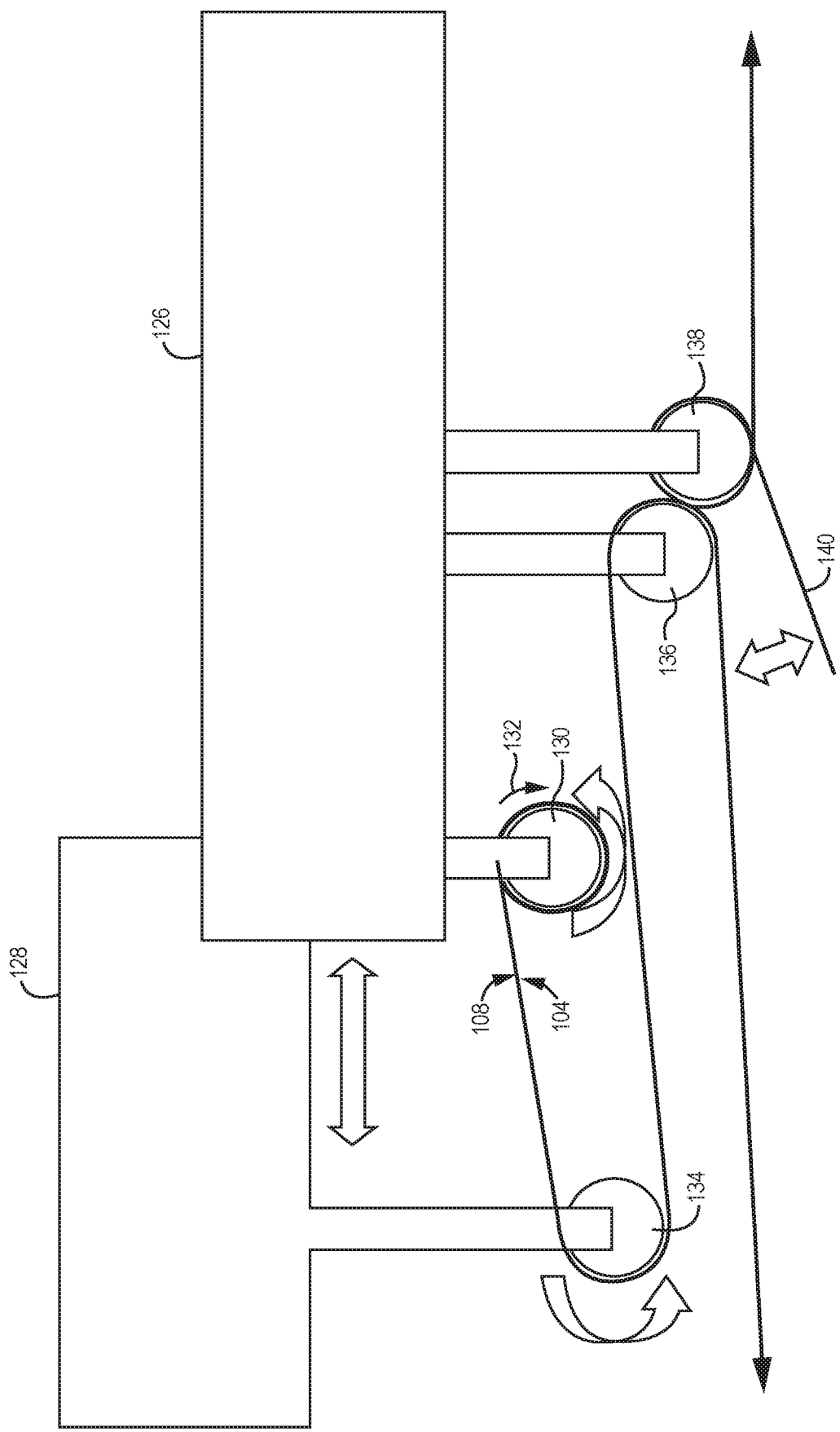
FIG. 14 is a schematic diagram illustrating cooperation and adjustment of a first rail and a second rail illustrated in FIG. 13 according to one embodiment.

FIG. 14 is a schematic diagram illustrating cooperation and adjustment of the first rail 126 and second rail 128 illustrated in FIG. 13 according to one embodiment. A first roller 130 is coupled to the first rail 126. The light diffusion material layer 108 and the chromakey screen 104 are wrapped around the first roller 130. The first roller 130 may include a torque mechanism, such as a spring or the like, that maintains tension on the light diffusion material layer 108 and the chromakey screen 104 in a direction 132.

The light diffusion material layer 108 and the chromakey screen 104 are coupled to the second rail 128 via a second roller 134, and the light diffusion material layer 108 and the chromakey screen 104 unwrap from the first roller 130 in response to the second rail 128 being urged in a direction away from the first rail 126. A tensioner pulley 136 provides tension to the light diffusion material layer 108 and the chromakey screen 104. The other end of the chromakey screen 104 may be wrapped around a surface termination pulley 138. The chromakey screen 104 may include a surface junction flap portion 140 that can be coupled to the chromakey screen 104, via hook and loop material for example, to minimize shadowing.

Figure 15:
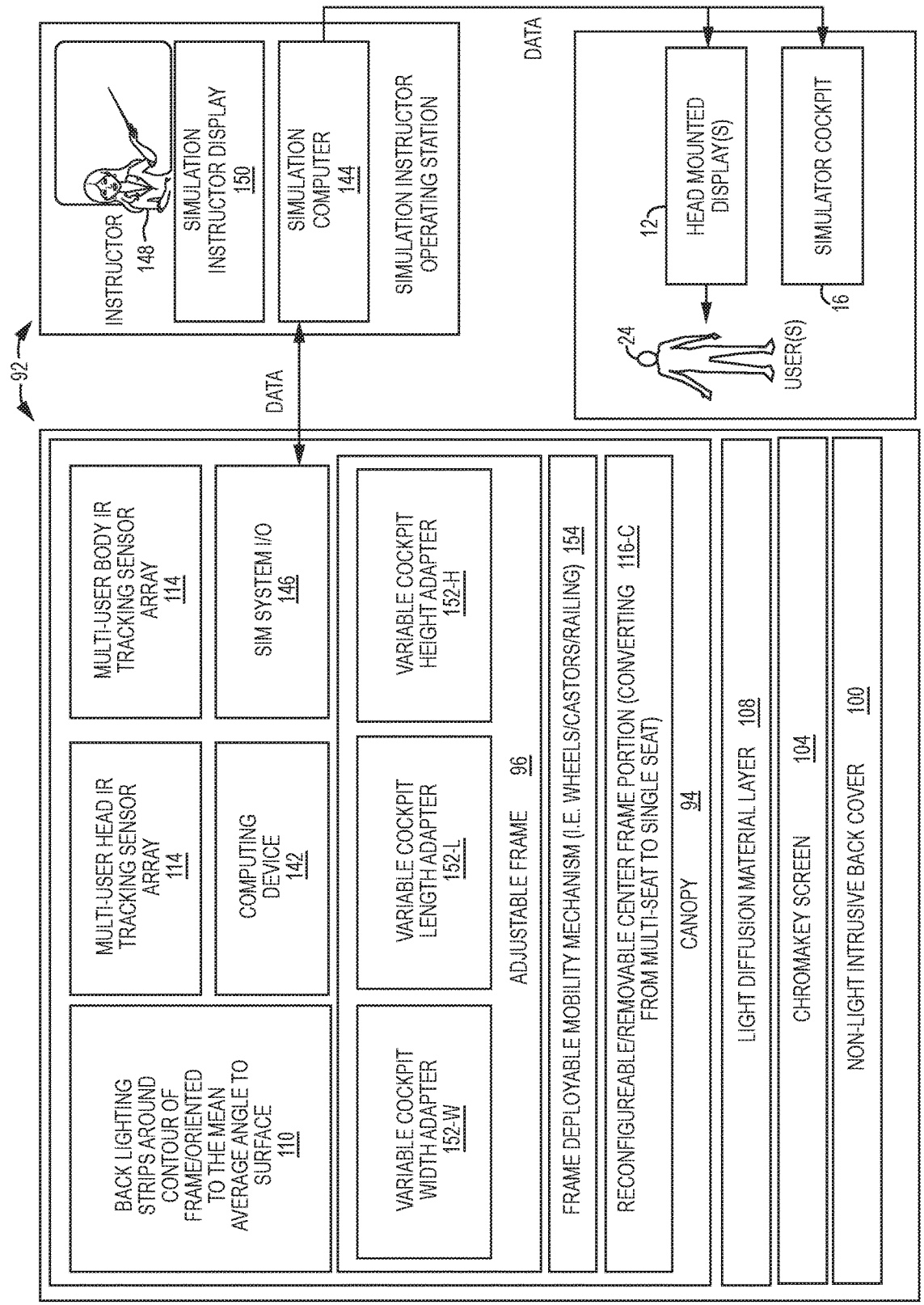
FIG. 15 is a block diagram identifying various components of the projectorless simulator according to one embodiment.

FIG. 15 is a block diagram identifying various components of the projectorless simulator 92 according to one embodiment. The projectorless simulator 92 may include a computing device 142 that is coupled to a simulation computer 144 via a simulation system input/output interface 146, such as a wired or wireless network. An instructor 148 operates the simulation computer 144 and observes the user 24 via a simulation instructor display 150. The simulation computer 144 is communicatively coupled to the HMD device 12 and the simulator cockpit 16, and, as will be discussed in greater detail herein, may provide real-time imagery of the instructor 148 to the user 24 via the HMD device 12 during a simulation.

The adjustable frame 96 includes a width adapter 152-W, a length adapter 152-L and a height adapter 152-H (generally, adapters 152) to vary the width, length, and height of the adjustable size canopy 94 on site as desired. The adapters 152 may include the frame members 124 illustrated in FIG. 13 and/or the frame portions 116 illustrated in FIG. 12. The projectorless simulator 92 may also include, as will be discussed in greater detail below, a mobility mechanism 154, such as wheels or castors, to facilitate movement of the projectorless simulator 92 after assembly.

Figure 16:
FIG. 16 is a diagram illustrating a view provided to a user via the HMD device illustrated in FIG. 1 that includes real-time imagery of an instructor according to one embodiment.

FIG. 16 is a diagram illustrating a view 156 provided to the user 24 via the HMD device 12 that includes real-time imagery 158 of the instructor 148 according to one embodiment. The real-time imagery 158 may be generated, for example, via the observer camera 99 (FIG. 10). The real-time imagery 158 is provided in conjunction with simulated imagery 160. In some embodiments, the real-time imagery 158 may be provided in response to input from the instructor 148 via the simulation computer 144 (FIG. 15). For example, the instructor 148 may observe what the user 24 is viewing and doing, and decide that the user 24 requires instruction, and operate a UI control (not illustrated) that upon activation causes the real-time imagery 158 to be provided to the HMD device 12. In other embodiments, the real-time imagery 158 may be provided to the HMD device 12 in response to input from the user 24. In particular, the user 24 may be able to operate a control on the HMD device 12 that causes the real-time imagery 158 of the instructor 148 to be provided to the HMD device 12. The size and location of the real-time imagery 158 may be positionable within the view 156 by the user 24 via interactions with the HMD device 12.

Figure 17:
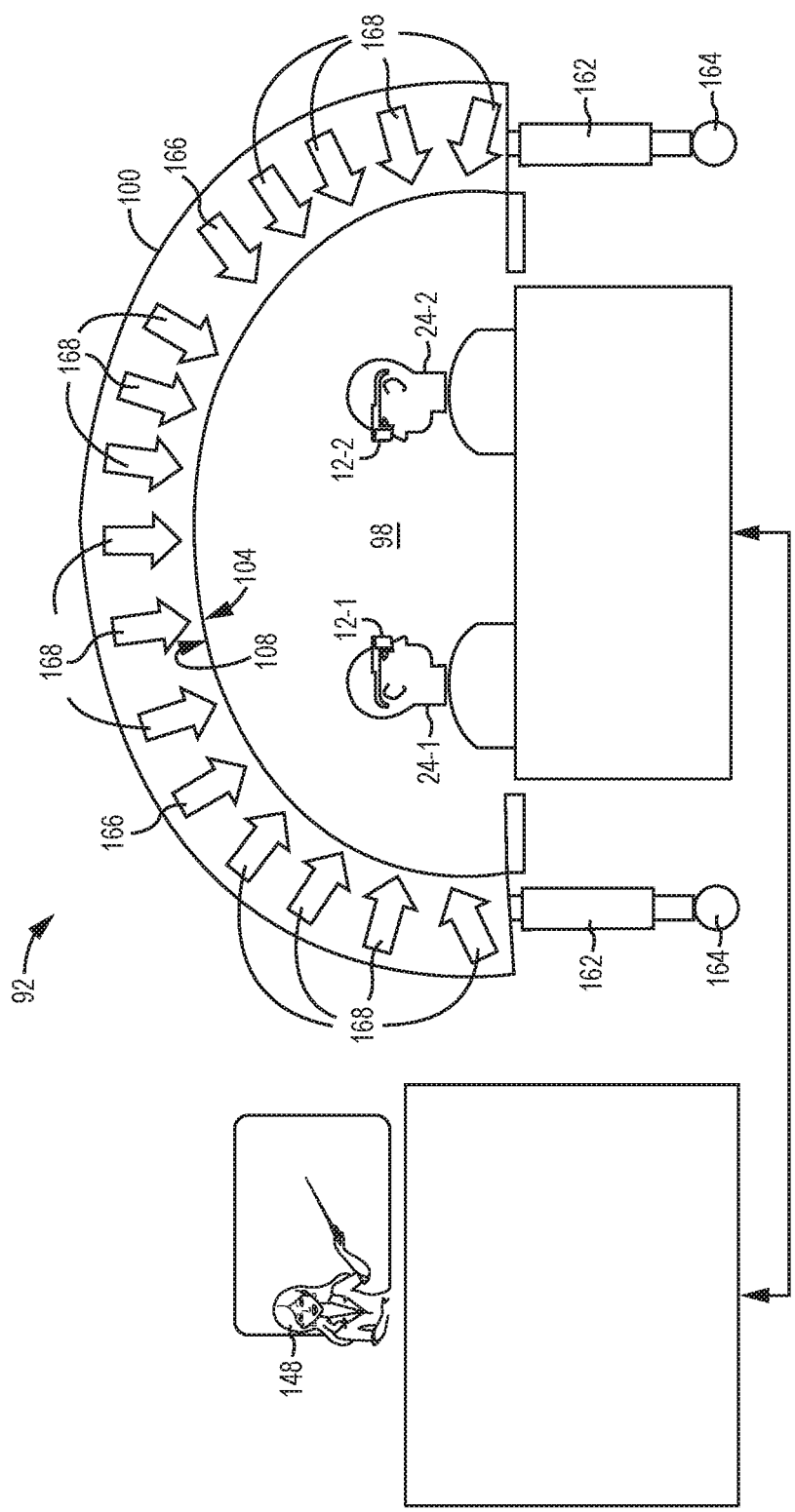
FIG. 17 is a schematic diagram illustrating additional aspects of the projectorless simulator according to one embodiment.

FIG. 17 is a schematic diagram illustrating additional aspects of the projectorless simulator 92 according to one embodiment. The projectorless simulator 92 includes a plurality of telescoping legs 162 that facilitates height adjustment of the projectorless simulator 92. The telescoping legs 162 may include rolling members, such as castors or wheels 164 to facilitate mobility of the projectorless simulator 92 after assembly.

The projectorless simulator 92 may include one or more arrays 166 of IR tracking sensors 114 that facilitate tracking of body parts of users 24-1, 24-2, such as heads and/or hands of the users 24-1, 24-2. The projectorless simulator 92 also includes arrays 168 of lights 110 that emit light, such as IR light, toward and through the light diffusion material layer 108 and the chromakey screen 104 into the interior volume 98, where it can be detected by HMDs 12-1, 12-2.

Figure 18:
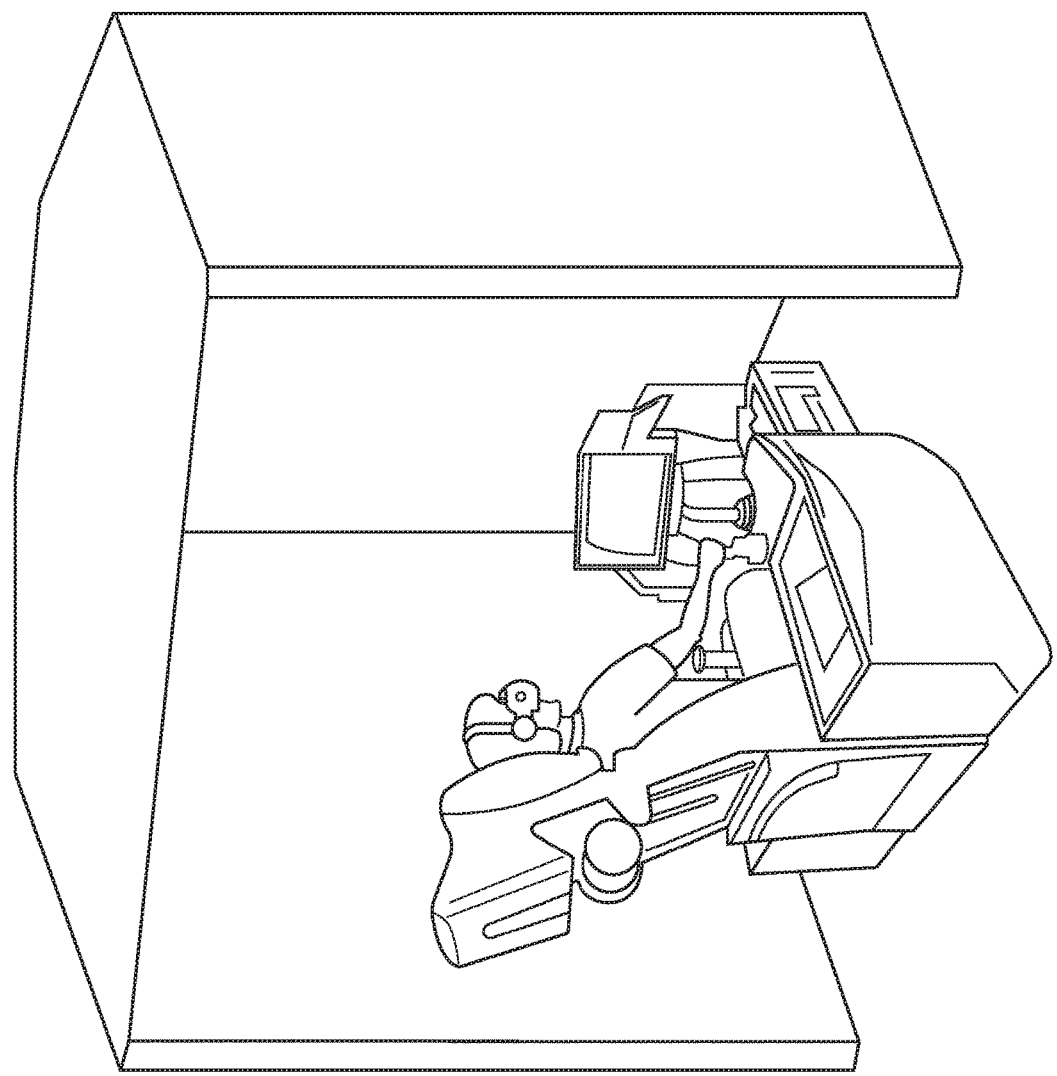
FIG. 18 is a diagram illustrating a single seat configuration according to one embodiment.

FIG. 18 is a diagram illustrating a single seat configuration according to one embodiment.

Figure 19:
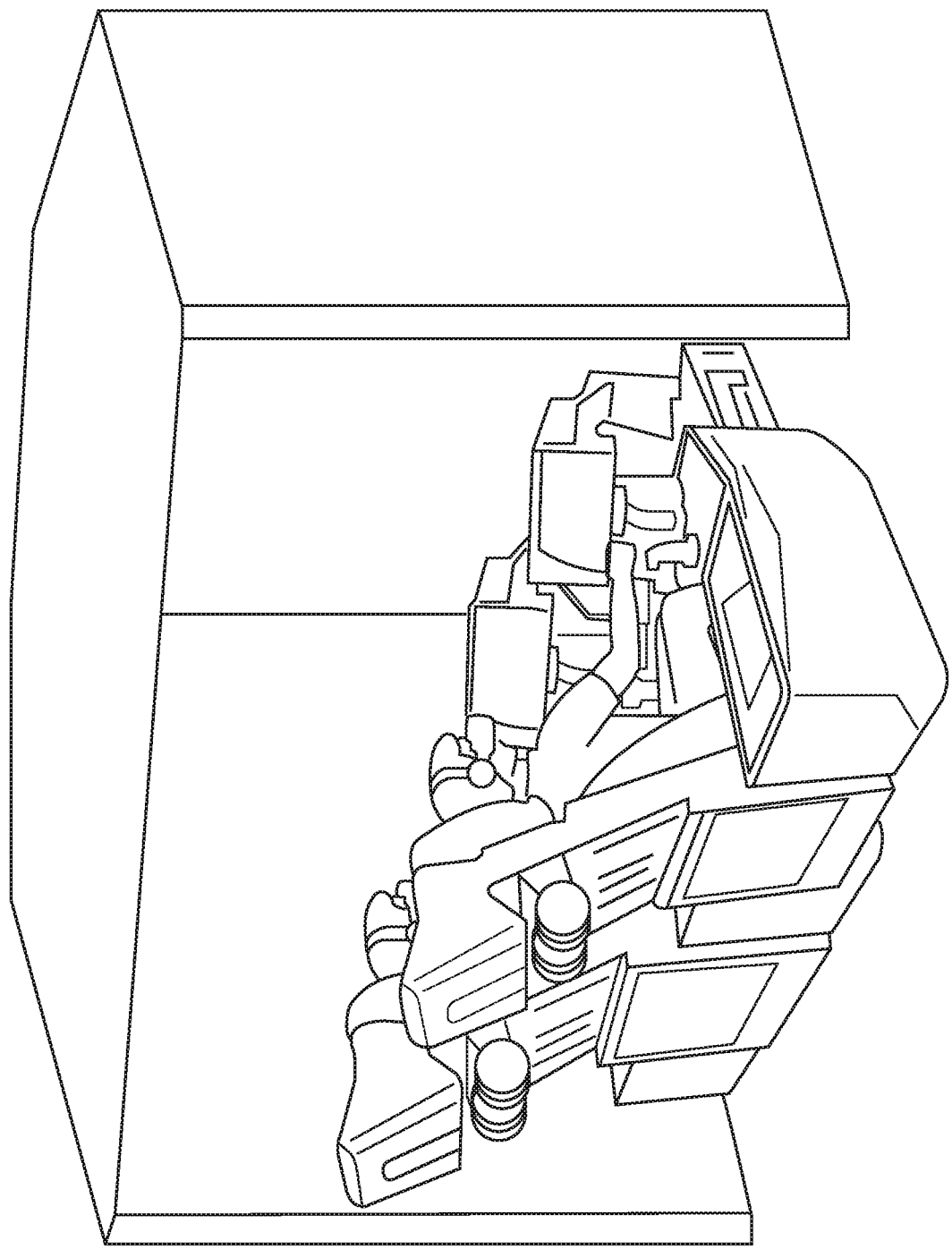
FIG. 19 is a diagram illustrating a multiple seat configuration according to another embodiment.

FIG. 19 is a diagram illustrating a multiple seat configuration according to another embodiment.

Those skilled in the art will recognize improvements and modifications to the preferred embodiments of the disclosure. All such improvements and modifications are considered within the scope of the concepts disclosed herein and the claims that follow.

What is claimed is:

1. A projectorless simulator comprising:
   an adjustable frame that defines an interior volume, the adjustable frame being adjustable in width and height to allow a shape of the interior volume to be varied;
   a chromakey screen coupled to the adjustable frame to at least partially enclose the interior volume, the chromakey screen being positioned between the adjustable frame and the interior volume such that the adjustable frame is not exposed to the interior volume; and
   a plurality of lights attached to the adjustable frame, the plurality of lights being positioned outside of the interior volume and being configured to emit light in a direction toward the chromakey screen.

2. The projectorless simulator of claim 1 further comprising:
   a light diffusion material layer separate from the chromakey screen, the light diffusion material layer positioned between the plurality of lights and the chromakey screen.

3. The projectorless simulator of claim 1 wherein the plurality of lights is fixed to the adjustable frame.

4. The projectorless simulator of claim 1 further comprising:
   a plurality of infrared (IR) tracking sensors mounted to the adjustable frame, the plurality of IR tracking sensors configured to emit IR electromagnetic radiation (EMR) through the chromakey screen to detect movement of a user within the interior volume.

5. The projectorless simulator of claim 4 wherein at least some of the plurality of IR tracking sensors are configured to detect movement of a head of the user.

6. The projectorless simulator of claim 4 wherein at least some of the plurality of IR tracking sensors are configured to detect movement of a hand of the user.

7. The projectorless simulator of claim 1 wherein the adjustable frame further comprises:
   a plurality of telescoping legs; and
   a plurality of rolling members coupled to corresponding ones of the plurality of telescoping legs.

8. The projectorless simulator of claim 1 further comprising:
   a portable cockpit configured to be positioned in the interior volume.

9. The projectorless simulator of claim 1 further comprising a back cover comprising an opaque material, the back cover being configured to be placed around the adjustable frame to inhibit light from an exterior environment from impinging on the chromakey screen.

10. The projectorless simulator of claim 1 wherein the adjustable frame comprises:
    a plurality of adjustable length frame members, each adjustable length frame member comprising a first rail that is configured to slide and engage a second rail to allow the adjustable length frame member to be adjusted to a desired length; and
    wherein at least some of the first rails of the plurality of adjustable length frame members are coupled to sets of the plurality of lights that are configured to emit light in the direction toward the chromakey screen.

11. The projectorless simulator of claim 10 wherein at least some of the plurality of adjustable length frame members further comprise:
    a first roller coupled to the first rail, the chromakey screen wrapped around the first roller, wherein the chromakey screen is coupled to the second rail and the chromakey screen unwraps from the first roller in response to the second rail being urged in a direction away from the first rail.

12. The projectorless simulator of claim 1 wherein the adjustable frame further comprises:
    a left frame portion, a center frame portion, and a right frame portion, the left frame portion having a plurality of connectors configured to couple to the center frame portion or the right frame portion, and the right frame portion having a plurality of connectors configured to couple to the center frame portion or the left frame portion.

13. The projectorless simulator of claim 12 wherein the chromakey screen comprises a left screen portion, a center screen portion, and a right screen portion.

14. The projectorless simulator of claim 1 further comprising a head-mounted display (HMD) device configured to be worn by a user.

15. The projectorless simulator of claim 14 further comprising a camera configured to capture real-time imagery of an instructor, and wherein the HMD device is configured to receive the real-time imagery of the instructor and to present the real-time imagery of the instructor to the user in conjunction with simulated out-the-window (OTW) imagery.

16. The projectorless simulator of claim 15 further comprising an instructor computing device communicatively coupled to the HMD device, wherein the HMD device is configured to receive the real-time imagery of the instructor and to present the real-time imagery of the instructor to the user in conjunction with the simulated OTW imagery in response to input from the instructor.

17. The projectorless simulator of claim 15 further comprising an instructor computing device communicatively coupled to the HMD device, wherein the HMD device is configured to receive the real-time imagery of the instructor and to present the real-time imagery of the instructor to the user in conjunction with the simulated OTW imagery in response to input from the user.

18. The projectorless simulator of claim 14 wherein the plurality of lights is further configured to emit IR EMR, and wherein the HMD device further comprises:
    an HMD frame;
    an IR sensor having an IR field of view (FOV) configured to:
        detect the IR EMR emitted via the chromakey screen; and
        output an IR sensor signal that identifies where, within the IR FOV the IR EMR is detected;

a display system having a display system FOV coupled to the frame and configured to present a real-world scene to the user; and a processor device communicatively coupled to the IR sensor and to the display system, configured to:
  generate out-the-window (OTW) imagery; and
  present the OTW imagery to the display system at locations within the display system FOV where the IR EMR was detected.

19. The projectorless simulator of claim 18 wherein the display system comprises a pixelated display screen comprising a plurality of pixels configured to be positioned in front of the user's eyes.

20. The projectorless simulator of claim 18 wherein the display system comprises:
  a transparent lens having a reflective interior surface configured to be positioned in front of the user's eyes; and
  a display device coupled to the frame, the display device configured to reflect images off the reflective interior surface into the eyes of the user.

21. The projectorless simulator of claim 1 wherein the interior volume is enclosed on at least two sides and a ceiling by the chromakey screen.

22. The projectorless simulator of claim 1 wherein the light emitted by the plurality of lights comprises infrared light.

* * * * *